US005883957A

United States Patent [19]

Moline et al.

[11] Patent Number: 5,883,957

[45] Date of Patent: Mar. 16, 1999

[54] METHODS AND APPARATUS FOR ENCRYPTING AND DECRYPTING MIDI FILES

[75] Inventors: William A. Moline, N. Reading; Frederick A. Putnam, Andover, both of Mass.

[73] Assignee: Laboratory Technologies Corporation, Wilmington, Mass.

[21] Appl. No.: 811,976

[22] Filed: Mar. 5, 1997

Related U.S. Application Data

[63] Continuation-in-part of Ser. No. 732,909, Oct. 17, 1996, which is a continuation-in-part of Ser. No. 716,949, Sep. 20, 1996.

[51] Int. Cl.[6] .......... H04L 9/00

[52] U.S. Cl. .......... 380/4; 380/49; 380/25

[58] Field of Search .......... 380/4, 49, 25

[56] References Cited

U.S. PATENT DOCUMENTS

| | | | |
|---|---|---|---|
| 5,187,352 | 2/1993 | Blair et al. | 380/25 |
| 5,388,264 | 2/1995 | Tobias et al. . | |
| 5,491,751 | 2/1996 | Paulson et al. | 380/25 |

OTHER PUBLICATIONS

Pennybrook, Prof. Bruce, Faculty of Music, McGill University, *Class Notes*, distributed Seminar—Winter 1996.

LeJeune, Urban A., *The New Netscape & HTML Explorer*, p. 337, The Coriolis Group, Inc., 1996.

Lipscomb, Eric, (BITNET:LIPS@UNTVAX), Introduction into MIDI, *North Texas Computing Center Newsletter*, "Benchmarks", Oct. 1989, . . . //www.harmony–central.com/MIDI/Doc/intro.hmtl.

Avatar Ontology: The Santa Fe Project, Oct. 1, 1996, pp. 1–3, URL:www.resrocket.com/sfproject.

What is Res Rocket Surfer?, *Internet Today Magazine*, Jan. 1996, www.resrocket.com/wwwhelp/whatis/html.

Microsoft WIN32 Programmer's Reference, vol. 2, *System Services, Multimedia, Extensions, and Applications Notes*, pp. 521, 524, 525, 529, 530, 531.

Netscape Plug–in, API from World–Wide–Web 1996.

*Primary Examiner*—David Cain
*Attorney, Agent, or Firm*—Banner & Witcoff, Ltd.

[57] ABSTRACT

Techniques for playing and distributing MIDI tracks in the context of a non-real-time network such as the Internet. One of the techniques makes it possible to begin playing a multi-track MIDI file that is being received over the Internet before the entire file has been received. Others of the techniques permit playing of MIDI tracks that are generated in real time and then distributed via the Internet. The techniques ensure that expected network delays will not cause underflow in the MIDI buffer, provide a way of playing an "endless" MIDI stream received via the Internet, and provide ways by which players may collaborate and even participate in jam sessions over the Internet. Also disclosed are techniques for including decrypters in MIDI synthesizers and using the decrypters in the context of encrypted MIDI streams received via the Internet.

18 Claims, 15 Drawing Sheets

METHODS AND APPARATUS FOR ENCRYPTING AND DECRYPTING MIDI FILES

CROSS REFERENCES TO RELATED APPLICATIONS

This patent application is a continuation-in-part of Methods and Apparatus for Distributing Live Performances on MIDI Devices via a Non-Real-Time Network Protocol, U.S. Ser. No. 08/732,909, filed Oct. 17, 1996, which is in its turn is a continuation in part of U.S. Ser. No. 08/716,949, Progressively Generating an Output Stream with Real-time Properties from a Representation of the Output Stream which is not Monotonic with regard to Time, filed Sep. 20, 1996. Both of the parent patent applications have the same inventor and assignee as the present patent application.

BACKGROUND OF THE INVENTION

1. Field of the Invention

The invention relates generally to encryption and decryption of information and more particularly to the encryption and decryption of MIDI files and tracks distributed via a public network such as the Internet.

2. Description of the Prior Art

The following Description of the Prior Art provides an overview of the MIDI protocol, of techniques used to distribute music represented by means of the MIDI protocol, and of prior-art techniques for preventing copying of MIDI files.

The MIDI Protocol

The Musical Instrument Digital Interface (MIDI) is a standard protocol which was originally developed to permit electronic instruments such as synthesizers to communicate with each other. One common use of the protocol is permitting a musician to play more than one electronic instrument at once. The instrument that the musician is actually playing not only generates sounds, but also generates a sequence of event messages. An event message may for example be a note on message, that indicates that a note of a given pitch has started to sound or a note off message that indicates that the note has ceased sounding. Many other kinds of event messages are defined as well. Another instrument receives the event messages from the first instrument and responds by performing the actions indicated in the messages. Thus, if the message is a note on message, the other instrument will begin sounding the note, and will thus "play along with" the first instrument. For purposes of the present discussion, the event messages can be divided into two classes: the note on and note off messages and the remaining messages, which will be termed herein control messages.

The sequence of MIDI protocols to which a musical instrument directly responds is termed herein a MIDI stream. Devices which respond to a MIDI stream are termed herein MIDI devices. MIDI devices include electronic musical instruments and the sound boards of many computers. In a MIDI stream, time relationships between events are simply determined by when the events appear in the event stream. For example, if a note is to be held for a period of one second, the note on message for the note will appear in the MIDI stream one second before the note off message for the note appears in the stream. Since the MIDI device will start sounding the note in response to the note on message and stop sounding the note in response to the note off message, the note will be sounded for one second. It should be further noted at this point that the MIDI device may be assigned one or more channels. Each channel is represented by a channel number and each event message includes a channel number. A given MIDI device will respond to a given event message only if the channel number in the event message specifies one of the channels assigned to the MIDI device.

Each MIDI device has three connectors for the cables used to carry MIDI streams. One of the connectors is an output connector. The cable connected to it carries a MIDI stream of event messages that originate at the MIDI device; another of the connectors is an input connector; the connected cable carries a MIDI stream of event messages that the MIDI device will respond to if the event messages specify the channel currently assigned to the MIDI device. The third connector is a through connector; the connected cable carries the MIDI stream received in the input connector.

The connectors and associated cables can be used to configure groups of MIDI devices. FIG. 5 shows one such configuration 501. Each MIDI device 113 has the three connectors: Input 505, output 507, and through 509. Output 507(*a*) of MIDI device 113(*a*) is connected by MIDI cable 510 to input 505(*b*) of MIDI device 113(*b*), while through connector 509(*b*) is connected to input 505(*c*) of MIDI device 113(*c*). As a consequence of these connections, the output of MIDI device 113(*a*) is played on both MIDI devices 113(*b*) and 113(*c*); additionally, notes produced by players of devices 113(*b*) and (*c*) will be heard from those devices.

In the MIDI stream, the interval of time between two event messages is simply the amount of time between when the first event message appears in the stream and when the second event message appears in the stream. For this reason, a MIDI stream cannot be stored in a medium such as a file which does not preserve the intervals between event messages and also cannot be transmitted by such a medium. The problem of storing a MIDI stream was solved by a special MIDI device 113, MIDI sequencer 511. Sequencer 511 receives one or more MIDI streams 111 and makes MIDI tracks 105 out of the MIDI streams 111 and MIDI files 103 out of the MIDI tracks. The files and tracks are stored in storage devices such as standard memories and/or disk drives.

As shown in FIG. 1 of the present application, MIDI file 103 has a header 104 which contains information such as the number of tracks. The MIDI file also contains at least one track 105. A given track i in such a file is indicated hereinafter by 105(*i*). Each track 105(*i*) contains a sequence of events 106. Each event 106(*j*) has two parts: an event message 117 and an elapsed time descriptor 119. The elapsed time descriptor indicates the time that is to elapse between the preceding event 106(*j*–1) and event 106(*j*). As can be seen from the foregoing, a given event 106's position in file 103 may be indicated by the index of its track and its own index in the track. Event 106(*i,j*) is thus event j in track i.

The MIDI stream 111 is generated from MIDI file 103 by MIDI controller 107. Prior-art MIDI controller 107 does this by first writing all of the tracks 105 from file 103 into controller memory 109, as shown by arrow 108, and then reading all of the tracks simultaneously in the fashion just described, as shown by arrow 110. To accomplish the simultaneous reading, MIDI controller 107 maintains a song position time value 121 which the controller can use together with the elapsed time descriptors to determine which event messages are to be output from the tracks at a given time. As would be expected from this procedure, and as shown in FIG. 1, MIDI stream 111 generally consists of interleaved event messages 117 from the tracks 105. MIDI stream 111 may then be responded to by any MIDI device 113, which then drives loudspeaker 115 to produce the sounds specified by MIDI stream 111. The standards for both MIDI streams and MIDI files are defined in the *MIDI Specification*, copyright 1983 and available from the MIDI Manufacturers' Association.

An important property of both MIDI tracks and MIDI streams is that they represent commands to MIDI devices, and not the output of those devices, and are consequently much smaller than representations of the output of the devices. This property is particularly valuable where storage space is limited, for instance in low-cost electronic devices, or where a low-bandwidth medium such as the Internet is being used to transmit the representation.

Distributing MIDI Files on the Internet

The advent of the personal computer opened whole new realms of applications for MIDI. First, many computers had sound boards that could interpret MIDI streams and were therefore themselves MIDI devices. Second, MIDI's small size and ability to represent actions that happen in real time made it attractive for any such application. For example, makers of game software used MIDI to provide program-controlled sensory feedback to a joystick. Finally, there was the wild growth of the Internet. The Internet's bandwidth problems made MIDI particularly attractive as a way of distributing music for MIDI devices over the Internet. FIG. 1 shows a prior-art technique for distributing music over the Internet An important limitation of the Internet is that it is not a real-time medium. This problem was overcome in the prior art by distributing music for MIDI devices over the Internet as MIDI files 105 using the techniques shown in FIG. 1. First, a MIDI file 103 was made from the MIDI stream 111, then the MIDI file was distributed over the Internet, and the arrangement shown at 101 of FIG. 1 was used to play the file on a MIDI device 113. The parent and the grandparent of the present patent application both concerned improved techniques for overcoming the non-real-time characteristics of the Internet and thereby making it possible to begin hearing a MIDI file without delay and to hear MIDI music as it was produced.

Protecting MIDI Tracks and Files: FIG. 12

The present patent application deals with the problem of protecting MIDI tracks and files from unauthorized copying. Copying is generally a more severe problem in the digital realm than in the analog realm because a copy of a digital representation is as good for all purposes as the original digital representation. In the case of MIDI tracks and files, copying is made even more attractive by the smallness of the MIDI representation and by the fact that it can be played on any kind of MIDI device.

In the prior art, MIDI files and tracks have been protected against copying by using the encryption and decryption techniques generally available for data. FIG. 12 shows a system 1201 in which such techniques are applied to a MIDI file 103 which is being sent by a network 1211 from a source 1203 to a destination 1213. MIDI file 103 is provided to encrypter 1207, which uses one of many known techniques to produce an encrypted version of MIDI file 1209 which has been encrypted using an encryption key 1208. Once encrypted, the file may only be decrypted by someone who has a decryption key for the file.

Encrypted file 1209 is then sent via network 1211 to destination 1209, where it is decrypted by decrypter 1217 using the decryption key 1218 appropriate to the encryption made by encrypter 1207. Decrypted MIDI file 1219 is identical to original MIDI file 103 and can be read by a file to stream translator 1221 to produce a MIDI stream 111 in the fashion described above. MIDI stream 111 is then sent to MIDI device 113, which produces analog signals 1227 that then go to loud speaker 115. For an overview of the large variety of encryption techniques which may be employed in system 1201, see Bruce Schneier, *Applied Cryptography, Protocols, Algorithms, and Source Code in C*, John Wiley and Sons, New York, 1994.

From the point of view of preventing copying of MIDI tracks and files, the arrangement of FIG. 12 has a number of problems. What the publisher of the MIDI track or file wishes the user to get in unencrypted form is only the sound produced when the MIDI device plays the MIDI stream. Even giving the user access to MIDI stream 111 is unacceptable, since anyone who has a MIDI sequencer 511 can produce a MIDI file 103 from the MIDI stream 111, and MIDI sequencers 511 can easily be implemented in software that will run on a standard personal computer (PC).

In system 1201, the user has access to decrypted MIDI at many points. Most obviously, system 1201 produces decrypted MIDI file 1219, which is accessible to the user of system 1201 and is equivalent for all purposes to original MIDI file 103. The user further has access to events 1220 as they are read from decrypted MIDI file 1219 to file to stream translator 1221, and can simply read the events into his own MIDI file. Finally, the user has access to MIDI stream 111, and can output stream 111 to a sequencer 511 to make his or her own MIDI file 103. One feature of modern computer systems which makes access to events 1220 and MIDI stream 111 particularly easy is that file to stream translator 1221 and MIDI device 113 are often implemented as dynamically-linked software libraries (DLLs). When a program executing in a personal computer uses programs in a dynamically-linked library, the DLL is linked to the program that uses it as the latter program begins executing. It is consequently easy for the user to substitute his own DLL for either the file to stream translator or the MIDI device 113 for the ones intended to be used to play the MIDI file, and instead of playing the MIDI file, the user can simply output the events 1220 to a file of his own or output MIDI stream 111 to a sequencer 511.

There are a number of requirements beyond security which must be satisfied by a commercially-viable encryption system for MIDI tracks and streams. First, a single source will be typically transmitting a file or track to many destinations. Second, many granularities of encryption must be possible. On the side of the publisher, it must be possible to encrypt entities ranging in size from the equivalent of a multi-CD album through a live concert down to an individual song; on the side of the recipient, it must be possible to implement decryption on a per-site, per-machine, per-code copy, or per-instance of execution basis. Finally, any encryption scheme must be cheap, but it also must be effective enough. In the context of MIDI publishing, effective enough means that it need not provide absolute security, or even security against a professional hacker, but simply be secure against the ordinary user.

It is an object of the present invention to overcome the problems of prior-art encryption for MIDI files and provide commercially-viable techniques for encrypting and decrypting MIDI tracks and files.

SUMMARY OF THE INVENTION

The foregoing objects and advantages of the invention will be apparent to those skilled in the arts to which the invention pertains upon perusal of the following Detailed Description and drawing, wherein:

Figure 1:
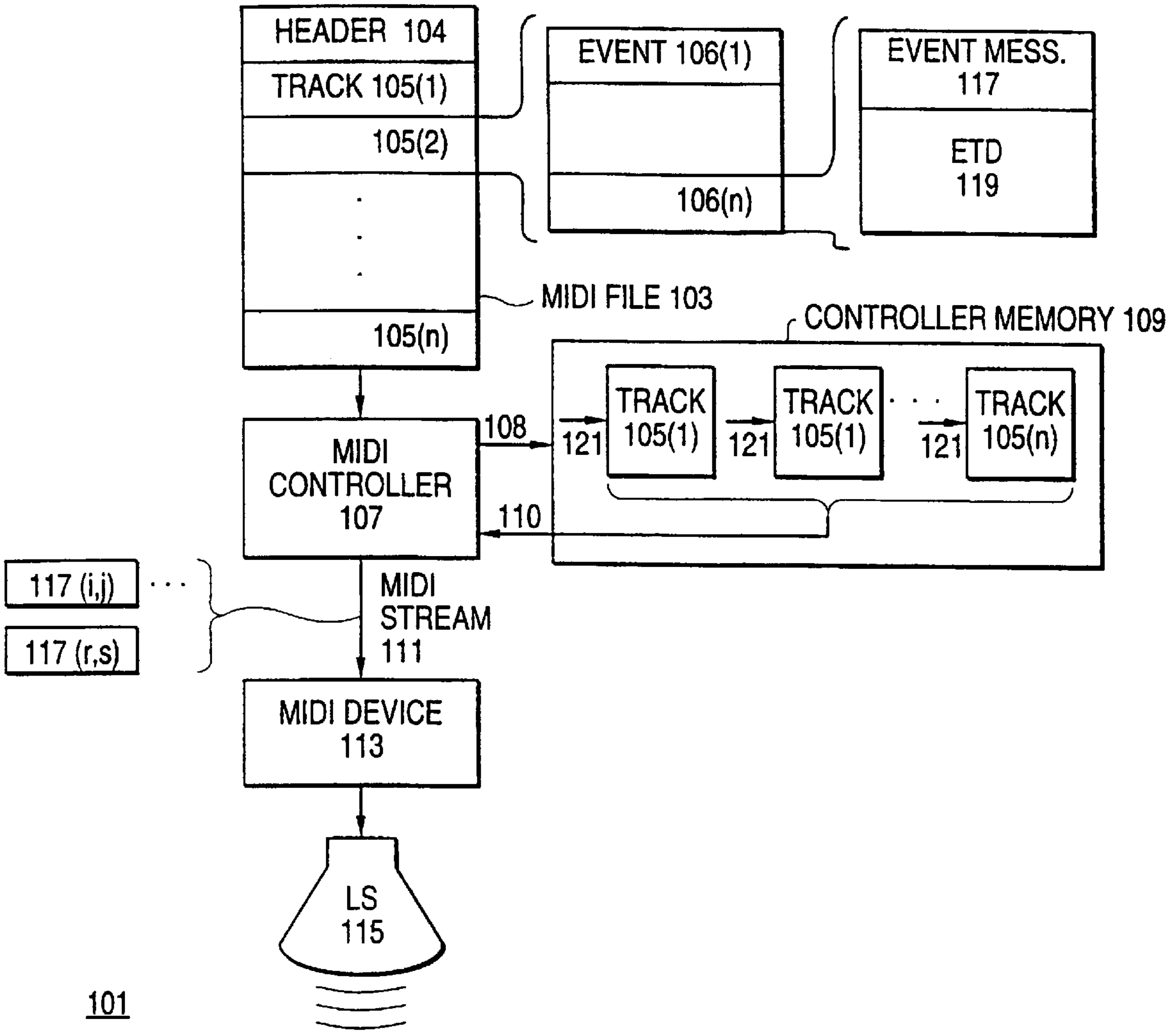
FIG. 1 (PRIOR ART)
FIG. 1 is a block diagram of a prior-art system for playing a MIDI file.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The following Detailed Description contains the entire Detailed Description of the parent and grandparent of the present application. To this material has been added the material that begins with the section titled Encrypting MIDI Files and Tracks.

The Detailed Description of the grandparent first describes how MIDI controller 107 may be modified to begin playing a track before the entire track has been received in MIDI controller 107, then describes how MIDI controller 107 may be modified to play a Format 1 MIDI file when all of the MIDI file's tracks have not yet been loaded into controller 107's memory, and finally shows how the invention may be implemented in the environment provided by the Netscape Web browser. The Detailed Description of the parent shows how MIDI tracks that are transmitted over a network may be played as they are produced and how a system which permits MIDI tracks to be played in this fashion can be further modified to permit the playing of endless MIDI tracks or to provide various modes of "playing along" as the track is produced.

Figure 2:
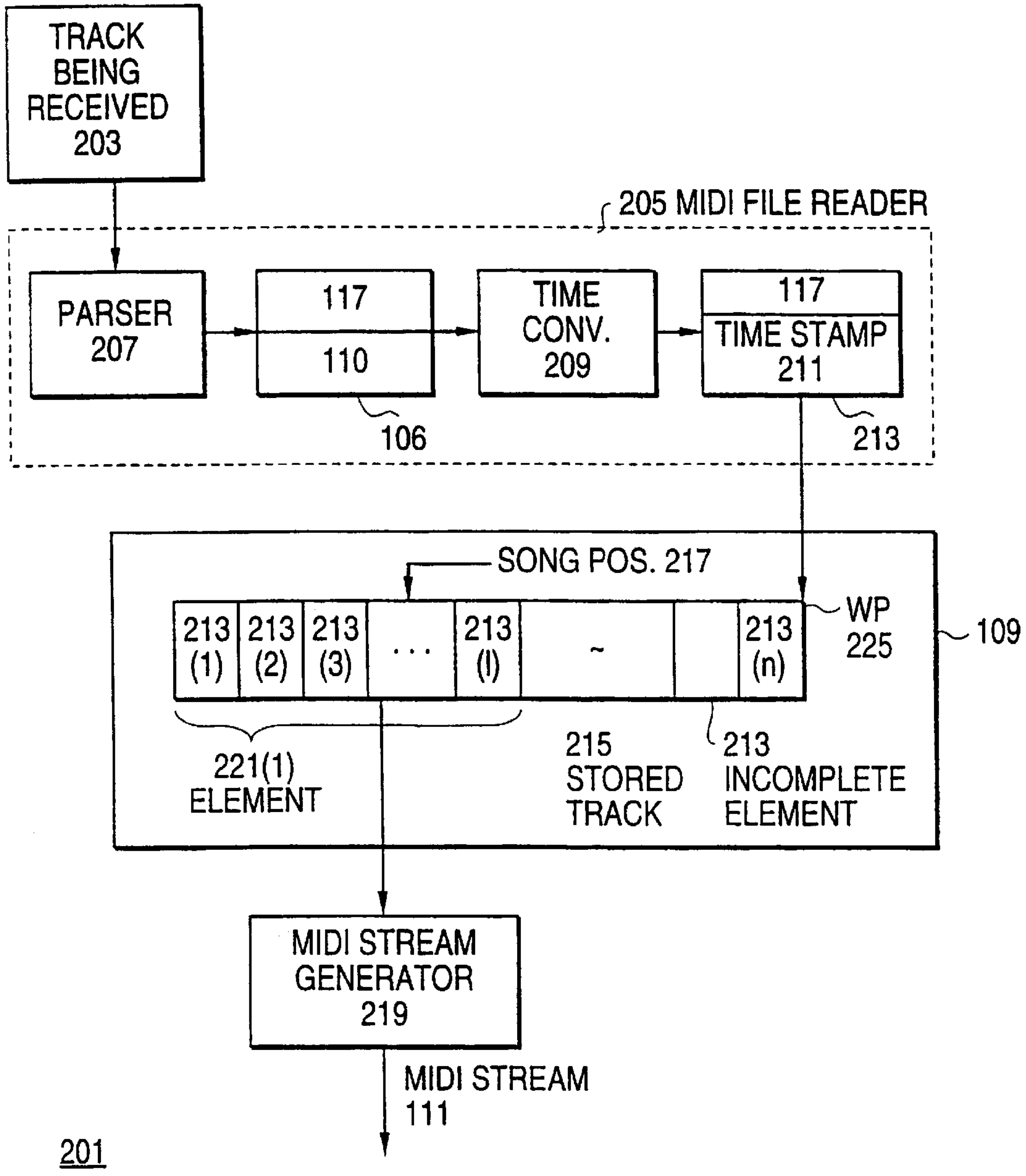
FIG. 2 is a block diagram of modifications to a MIDI controller to permit playing an incomplete track.

Playing a Track while it is being Received: FIG. 2

FIG. 2 shows how a MIDI controller like that shown at 107 may be modified to begin playing a track of a MIDI file 103 before the entire track has been received in controller 107. Modified controller 201 has two main components: a MIDI file reader 205, which reads the track 203 being received and places information from the track in memory 109, and MIDI stream generator 219, which reads what file reader 205 has placed in memory 109. In contradistinction to prior-art MIDI stream generators, MIDI stream generator 219 does not wait to begin reading until file reader 205 has finished reading all of track 203 into memory 109, but instead operates concurrently with file reader 205. In the preferred embodiment, both file reader 205 and MIDI stream generator 219 are event driven: File reader 205 responds to an event that indicates that the next portion of track 203 has been received in controller 107; whenever the event occurs, file reader 205 runs and places the MIDI events 106 from that portion in memory 109; MIDI stream generator 219 responds to a timer run-out event. That event occurs whenever a timer set by MIDI stream generator 219 runs out. In a preferred embodiment, MIDI stream generator 219 sets the timer to run out after an interval of 2 milliseconds. In general, the shorter the interval, the closer the output stream will approximate the original MIDI stream captured in the MIDI file.

Conceptually, MIDI stream generator 219 keeps track of the last event 106 that it output, the amount of time that has actually elapsed since it began playing the track, and the total amount of time specified by the elapsed time indicators in the events 106 played thus far. Each time the timer expires, MIDI stream generator 219 looks at events 106, beginning with the one following the last event 106 that it output. If the sum of the total elapsed time and the elapsed time indicator for an event is less than or equal to the time that has actually elapsed, MIDI stream generator 219 outputs the event. The intervals at which the timer runs out are short enough so that the intervals separating the event messages in MIDI stream 111 are substantially those specified in the elapsed time descriptors 119. Since file reader 205 generally receives track 203 much more rapidly than MIDI stream generator 219 reads it, MIDI stream generator 219 can play track 203 as it is loaded.

Continuing in more detail, MIDI file reader 205 includes two subcomponents that are important for the present discussion: parser 207 and time converter 209. Parser 207 reads events 106 in order from track 203. Each event 106 of course includes event message 117 and elapsed time descriptor 119. As an event is read, it is passed to time converter 209, which converts elapsed time descriptor 119 to time stamp 211. As previously described, elapsed time descriptor 119 specifies the time elapsed since the last event message 117; time stamp 211 contains the sum of the elapsed times in all of the time descriptors 119 from the beginning of track 203 to the current event 106. The result of this operation is an event 213, which is then added to stored track 215 in memory 109. The point at which the next event is to be added is specified by write pointer (WP) 225. Elapsed time descriptor 119 is converted to time stamp 211 in the preferred embodiment in order to simplify the computations performed by MIDI stream generator 219 in determining whether an event is to be output to MID stream 111.

In a preferred embodiment, stored track 215 is subdivided into elements 221. When MIDI file reader 205 begins reading events 106 from file 203, it allocates an element 221; it places events 106 in the element until it is full and then allocates another element. All elements but the last to be allocated are full, and consequently, MIDI stream generator 219 can detect when it is approaching the end of stored track 215 currently being written by the presence of an incomplete element 223. In the preferred embodiment, an incomplete element 223 is one for which write pointer 225 is not at the end of the element.

MIDI stream generator 219 generates MIDI stream 111 from stored track 215 as follows:

Each time the timer expires, do the following:

1. Determine how much time has actually elapsed since MIDI stream generator 219 has begun playing the track; this is the current song position, indicated in FIG. 2 as SongPos 217.
2. Beginning with the event 213 following the last event to be played, output event messages 117 until either an event 213 is reached whose time stamp is greater than SongPos 217 or one is reached that is in an incomplete element 223.
3. At that point, set the timer and wait for it to expire again.

Figure 3:
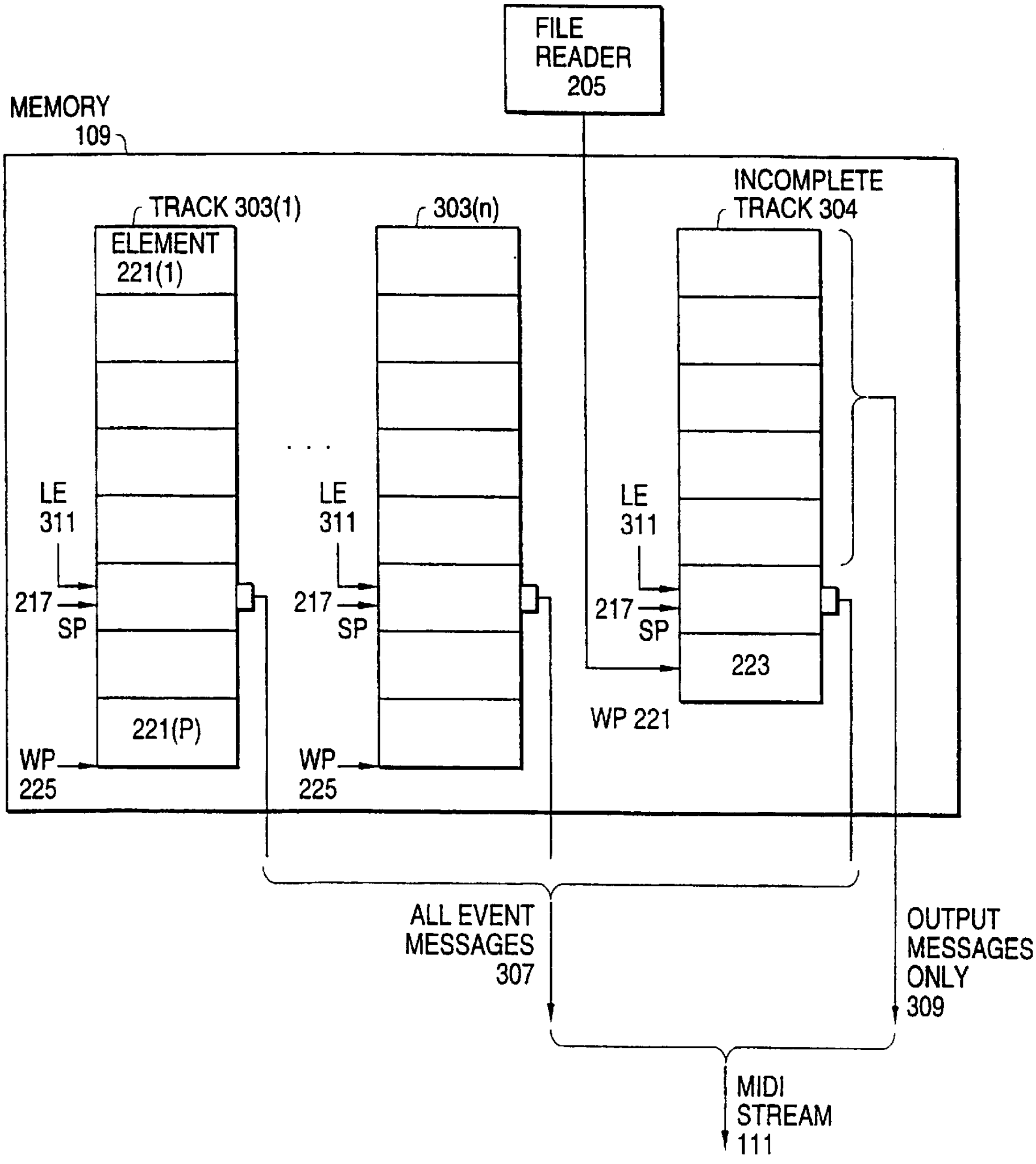
FIG. 3 is a block diagram of a further modification to a MIDI controller to permit playing a multi-tracked MIDI file with an incomplete track.

Playing Multi-Tracked MIDI files as they are Received: FIG. 3

The technique just described is sufficient for playing MIDI files with only one track, such as Format 0 MIDI files or Format 1 Midi files with only one track. With multi-track files, it is also necessary to solve the problems resulting from the fact that MIDI stream generator 219 plays each track at the position determined by SongPos 217 and must therefore be able to begin playing tracks other than the first track to be received "in the middle". Starting in the middle is complicated by the fact that how a MIDI device responds to a note on or note off event message is determined not only by the message, but also by control event messages which preceded the note on or note off message in MIDI stream 111.

FIG. 3 shows how file reader 205 writes the tracks it receives into memory 109 and how MIDI stream generator 219 reads the tracks. File reader 205 receives the tracks sequentially, and as it receives each track, it writes the track to memory 109 as described with regard to FIG. 2 above. As a result, the tracks appear as shown in FIG. 3. File reader 205 has already read tracks 105(1) through 105(n−1) into memory as stored tracks 301(1) through 303(n−1). That these tracks are complete is indicated by the fact that the track's write pointer 225 is at the end of the last element. File reader 205 is presently reading track 105(n) and has stored the portion it has read in incomplete stored track 304. Each track 303 is made up of a sequence of elements 221, with the last element in track 304 being an incomplete element 223 to which file reader 205 is still writing events 213.

MIDI stream generator 219 begins generating MIDI stream 111 from track 303(1) as soon as file reader 205 has written the first complete element 221 to the file. In other embodiments, MIDI stream generator 219 may begin reading even before the first complete element has been written. Of course, at this point, MIDI stream 111 contains only event messages from track 303(1), and consequently, the MIDI device that is responding to stream 111 plays only the part contained in track 303(1). For example, if that track contains the percussion part, that is the first part that the responding device plays. As soon as file reader 205 has written enough of track 303(2) that SongPos 217 specifies a location in a completely-written element 221, MIDI stream generator 219 begins generating MIDI stream 111 from track 303(2) as well, and so on, until file reader 205 has written the last track past the location currently represented by SongPos 217. At that point, MIDI stream 111 is being generated from all of the tracks 303 and 304.

As heard by the listener, the music begins with the part contained in the first track to be received; as each track is received, the part contained in the track is added, until the listener finally hears all of the parts together. This incremental addition of parts has an effect which is similar to the incremental increase in definition that is often employed when a graphics element is displayed on a Web page. The user begins seeing the graphics element or hearing the music with minimum delay and can often even decide on the basis of the low-definition display of the graphics element or the rendering of the music with fewer than all of the parts whether he or she has any further interest in the graphics element or the music.

MIDI stream generator 219 generates MIDI stream 111 from complete tracks 303 (1 . . . n) and incomplete track 304 as follows:

Each time the timer expires, do the following:

1. For each track, determine how much time has actually elapsed since MIDI stream generator 219 has begun playing the track; this is the current song position, indicated in FIG. 2 as SongPos 217.
2. In each complete track 303, beginning with the event 213 following the last event to be played, output event messages 117 until an event 213 is reached whose time stamp is greater than or equal to SongPos 217.
3. In incomplete track 304,
   a. do nothing if the current position indicated by SongPos 217 is beyond the last complete element 221 in incomplete track 304.
   b. Otherwise,
      i. If this is the first time event messages 117 have been output from incomplete track 304, begin at the top of track 304 and output only the control event messages until SongPos 217 is reached.
      ii. After the first time, treat incomplete track 304 in the same fashion as complete tracks 303.
4. Set the timer and wait for it to expire again.

Outputting the control event messages but not the none on or note off messages from the beginning of incomplete track 304 to SongPos 215 the first time event messages are output from incomplete track 304 ensures that the MIDI device which receives plays MIDI stream 111 will have received all of the control messages it needs when it plays the note on or note off events output between last event 311 and SongPos 217. Any technique which achieves the same purpose may be employed instead of the one just described. For example, in other embodiments, MIDI stream generator 219 may search back through the track until it has found all of the control event messages relevant to the current position of SongPos 217 and then output only those control event messages before beginning to output note on or note off event messages.

The foregoing appears in FIG. 3 as arrow 307, showing how in all tracks from which event messages have already been output, all event messages between last event 311 in the track and SongPos 217 are output to MIDI stream 111, and arrow 309, showing how the first time event messages are output from incomplete track 304, only the control event messages are output from the top of incomplete track 304 through SongPos 217.

Figure 4:
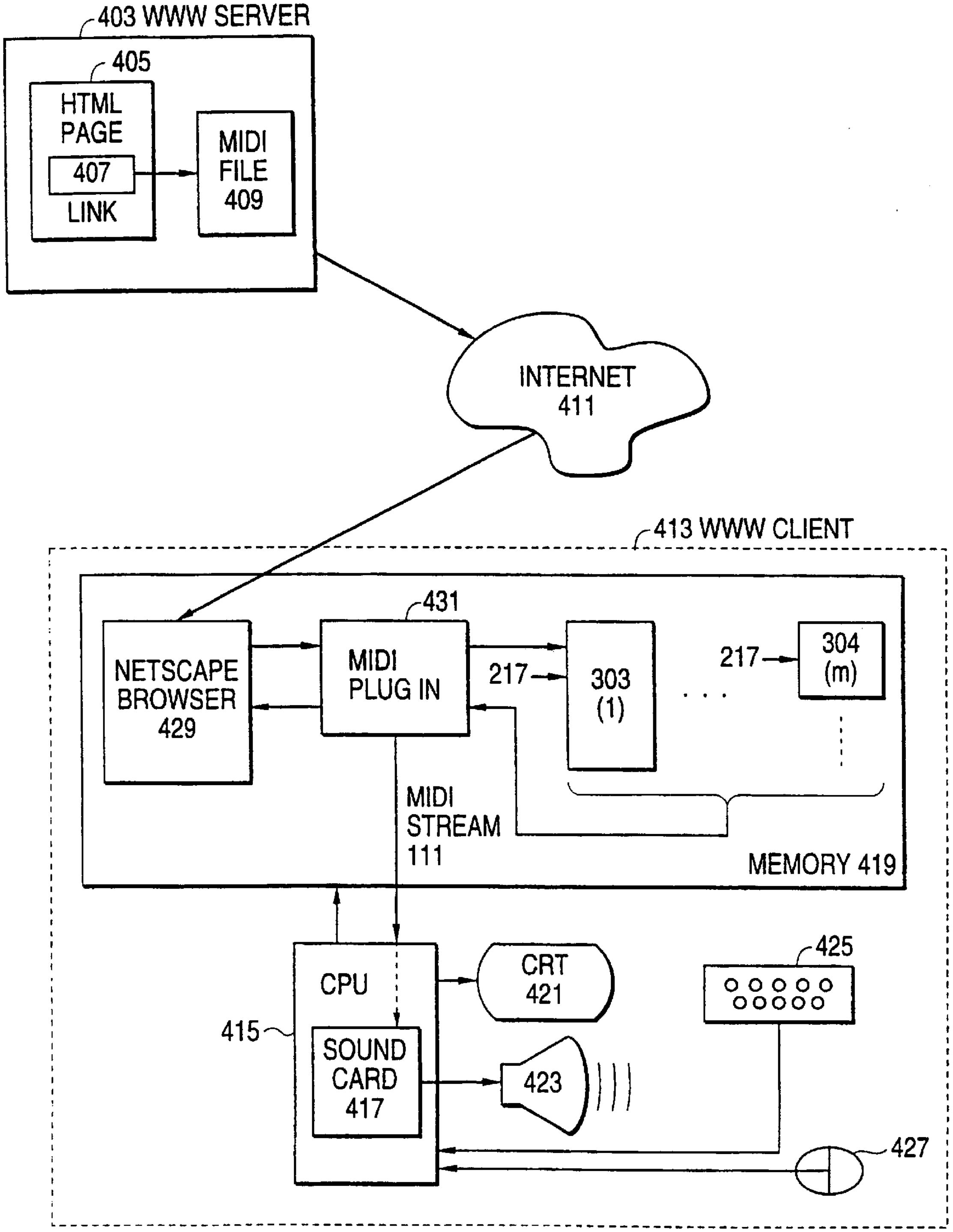
FIG. 4 is a block diagram of an embodiment of the invention for use with a World Wide Web browser

Incorporating the Invention into a Web Page Browser: FIG. 4

As indicated above, one application in which the invention's ability to begin playing before a complete MIDI file has been received by the MIDI controller is particularly valuable is where the MIDI file is being transferred via the Internet, either as an inclusion in a Web page which has been downloaded by a user or as a file that is referred to by a link in a Web page. In such applications, the most natural place to implement the invention is in a World Wide Web browser.

FIG. 4 shows a presently-preferred implementation of the invention in a Netscape browser. System 401 includes a World Wide Web server 403 which serves pages 405 written in the HTML language via Internet 411 to a World Wide Window client 413. An HTML page 405 may include a link 407 to a MIDI file 409. Client 413 may be implemented in any kind of computer system, but client 413 is implemented in FIG. 4 in a standard PC. The PC has a memory 419, a processor 415 which includes a sound card 417 which is a MIDI device, and peripheral devices including a CRT display 421, a loudspeaker 423 which is connected to sound card 417, keyboard 425, and mouse 427. The program which causes the PC to function as a World Wide Web client 413 is Netscape browser 429, which responds to an input of a Universal Resource Locator (URL) specifying an HTML page 405 in a particular server 403 by first executing a protocol which retrieves the page 405 from server 403 and then interprets the page to produce a display in CRT 421 of the type specified by HTML page 405.

A given HTML page may have non-HTML inclusions such as pages written in different mark up languages, files containing vector graphics, compressed video, sound files, or MIDI files. If a browser includes the software to respond to such a file, the browser will display or play the file; otherwise, it will just display the surrounding HTML. Given the pace at which Web technology is changing and the varying needs of users of browsers, providing the software needed to read inclusions has become a problem for manufacturers of browsers. Netscape Communications Corporation has addressed this problem by making it easy for third parties to write software which can be used by Netscape browsers to read inclusions. Such software is termed by the art a "plugin".

Figure 6:
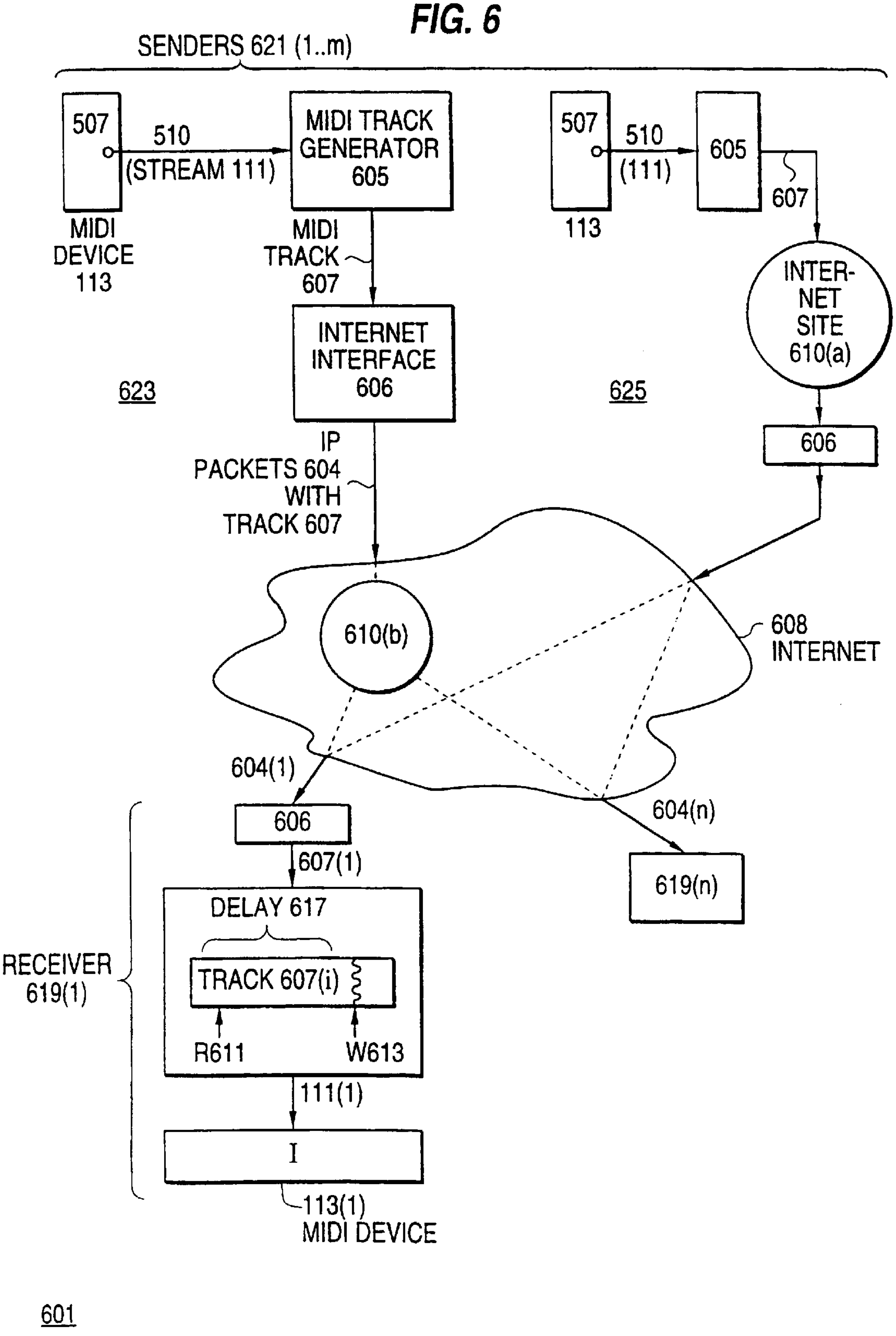
FIG. 6 is an overview of a technique for transmitting a live performance on a MIDI device via the Internet.

A MIDI plugin incorporating the invention is shown at 431 in FIG. 4. A user of a Netscape browser 429 can use his browser to download a desired plugin from the Internet, and after the browser has downloaded the plugin, the user can place it in a directory in which browser 429 looks for plugins. When browser 429 receives an inclusion of the type read by the plugin, the browser activates the plugin. The plugin uses browser 429's facilities to fetch the inclusion and then reads or plays the inclusion. As shown in FIG. 4, a MIDI plugin 431 which incorporates the invention performs substantially the same tasks as a MIDI controller which incorporates the invention. Plugin 431 has a file reader 205 and a MIDI stream generator 219. File reader 205 reads MIDI file 409 serially as it is received in browser 429 and outputs events 213 to memory 419. File reader 205 includes a parser 207 which reads events 106 and a time converter 209 which converts elapsed time descriptors 119 to time stamps 211 and thereby produces events 213. As this process goes on, one or more tracks 303 are written to memory 419, with file reader continuing to write to the end of the track that is currently being received in browser 429. Meanwhile, MIDI stream generator 219 operates as just described to generate MIDI stream 111 from tracks 303 and 304. The event messages go to sound card 417, which drives PC loudspeaker 423. Netscape Communications Corporation has defined an Application Programmer's Interface (API) for plugins for the Netscape browser. A detailed description of plugins for the Netscape browser and of the Application Programmer's Interface could be found in September, 1996 at the URL http://home.netscape.com/eng/mozilla/3.0/handbook/plugins/pguide.htm Overview of Live MIDI: FIG. 6

The Detailed Description of a preferred embodiment of the invention of the present patent application begins with an overview of the invention and then provides more detailed disclosure of the components of the preferred embodiment.

What is termed herein live MIDI is the distribution of a MIDI track from a server to one or more clients using a non-real-time protocol and the playing of the MIDI track by the clients as the track is being distributed. One use of live MIDI is to "broadcast" recitals given on MIDI devices as they occur. In this use, the MIDI stream produced during the recital is transformed into a MIDI track as it is being produced and the MIDI track is distributed to the clients, again as it is produced, so that the clients are able to play the MIDI track as the MIDI stream is produced during the recital. The techniques used to implement live MIDI are related to techniques disclosed in the parent of the present patent application for reading a MIDI track 105 as it is received. These techniques, and related techniques for generating a MIDI track from a MIDI stream as the MIDI stream is received in a MIDI sequencer are employed to receive the MIDI stream, produce a MIDI track from it, distribute the track using the non-real-time protocol, and play the track as it is received to produce a MIDI stream. The varying delays characteristic of transmissions employing non real-time protocols are dealt with by waiting to begin playing the track in the client until enough of the track has been received that the time required to play the received track will be longer than the greatest delay anticipated in the transmission.. Other aspects of the techniques permit a listener to begin listening to the track at points other than the beginning of the track, permit the distribution of an essentially endless track, and permit use of the non-real-time protocol for real-time collaboration among musicians playing MIDI devices.

FIG. 6 shows a system 601 that embodies the principles of the invention. FIG. 6 has three main components: one or more senders 621 (1 . . . m) which are sources of MIDI streams 111, Internet sites 610(*a* and *b*) that are connected via Internet 608 to senders 621, and one or more receivers 619(1 . . . n), which have established connections with Internet sites 610 to receive a MIDI track 607 made from MIDI stream 111 and produce a MIDI stream 111 from track 607.

Continuing in more detail with senders 621, two kinds of such senders are shown. Components 113 and 605 are identical for both. In both senders, a MIDI device 113 produces a MIDI stream 111 and provides it to a MIDI track generator 605. MIDI track generator 605 generates a MIDI track 607 from MIDI stream 111. MIDI track 607 is like MIDI track 215 of the parent patent application in that track 607 is a sequence of events 213. Each event 213 contains a MIDI event message 117 and a time stamp 211 which indicates the length of time between the beginning of the MIDI stream being recorded in the track and the occurrence of the event message 117 contained in the event.

The difference between sender 613 and sender 625 lies in their relationship to Internet 608. Sender 623 has access to Internet 608 but is not itself a site 610 in Internet 608, that is, other participants in Internet 608 cannot use an Internet browser to establish a connection with Sender 623. Sender 625 is itself a site 610(*a*) in Internet 608. Beginning with sender 613, since sender 613 is not itself a site in Internet 608, it must send track 607 to such a site, in this case, site 610(*b*). It does so by sending track 607 to Internet interface 606, which has established a TCP session with Internet site 610(*a*) and outputs track 607 as a sequence of packets 604 addressed to Internet site 610(*a*). The packets satisfy the IP protocol. The TCP session cannot guarantee that Internet site 610 will receive a given packet at any given time or indeed receive it at all, or that it will receive a given sequence of packets in any particular order, but it can guarantee that Internet site 610 and sender 621 can detect lost or damaged packets and can also request that a lost or damaged packet be resent. The protocols thus provide an environment in which all packets sent via a given session eventually arrive.

Receivers 619 who wish to hear the stream 111 produced by sender 623 establish a connection via Internet 608 with Internet site 610(*b*). As Internet site 610(*b*) receives packets 604, it reads the data from them to produce a copy of MIDI track 607 in Internet site 610(*b*). It then provides the events in the copy of MIDI track 607 in the order in which they occur in the track to each of receivers 619. It does so via the Internet, and consequently, the events must be incorporated into packets destined to the various receivers 619. As will be pointed out in more detail below, a receiver 619 may begin receiving track 607 from Internet site 610 at any time after Internet site 610 has itself begun to receive it.

In the case of sender 625, that sender itself includes Internet site 610(*a*), so that receivers 619 are able to establish a connection via Internet 608 directly with sender 625. In this case, Internet interface 606 is between site 610(*a*) and the remainder of the Internet. Which of the arrangements of senders 621 is to be preferred is determined by circumstances; where there are relatively few receivers 619, the resources available in a Web site belonging to a sender 621 may be sufficient to serve them all; where there are many receivers 619, a powerful Internet site owned by a party such as a publisher for MIDI music may be required.

Each receiver 619 includes an Internet interface 606 for receiving IP packets 604 according to the TCP protocol and outputting track 607, a track-stream transformer 612 for transforming track 607 back into a MIDI stream 111, and a MIDI device 113 which can respond to stream 111. Track stream transformer 612 works generally in the same fashion as apparatus 201 of the parent application. Track 607 received at receiver 619 is identical to track 607 generated by MIDI track generator 605, but is received in receiver 619 with a delay which is dependent upon the path(s) in Internet 608 by which the packets 604 carrying track 607 are sent to receiver 619 and upon the condition of the Internet nodes and links on those paths. The delay will generally be different for each receiver 619. This fact is indicated in FIG. 6 by assigning the index of receiver 619 to the packets 604 it receives, the track 607 received via the packets, and the MIDI stream produced by transformer 612. A receiver may be implemented as software executing on a processor. The processor may be in a PC, or may be in a specialized audio device. The software may be an independent module or it may be implemented as part of an Internet browser. In the latter case, it is particularly advantageous to implement the software as a plugin for the browser.

If the delay were constant, it would be possible to start generating MIDI stream 111(1) in receiver 619(1) from track 607(1) as soon as the first event in track 607(1) began arriving in track-stream transformer 612. The delay varies, however, and consequently, if that were done and the delay increased, track-stream transformer 612 could run out of track 607 from which to generate stream 111. To prevent this, the preferred embodiment waits to begin playing track 607 until enough of track 607 has accumulated in receiver 619 that playing the accumulated track will require a period longer than the greatest anticipated delay. This portion of the track appears as delay 617 in FIG. 6. In a preferred embodiment, the amount of track 607 that must be accumulated before receiver 619 begins playing the track is determined by a delay parameter set by the user of receiver 619(1); in other embodiments, Internet site 610 may use information that it has about the behavior of Internet 608 to provide a delay parameter to receiver 619(1) when receiver 619(1) establishes the connection with Internet site 610 over which track 607(1) is to be received. It should be pointed out here that the technique for dealing with transmission delay can also be used in playing MIDI tracks in the manner described in the parent of the present patent application.

Figure 7:
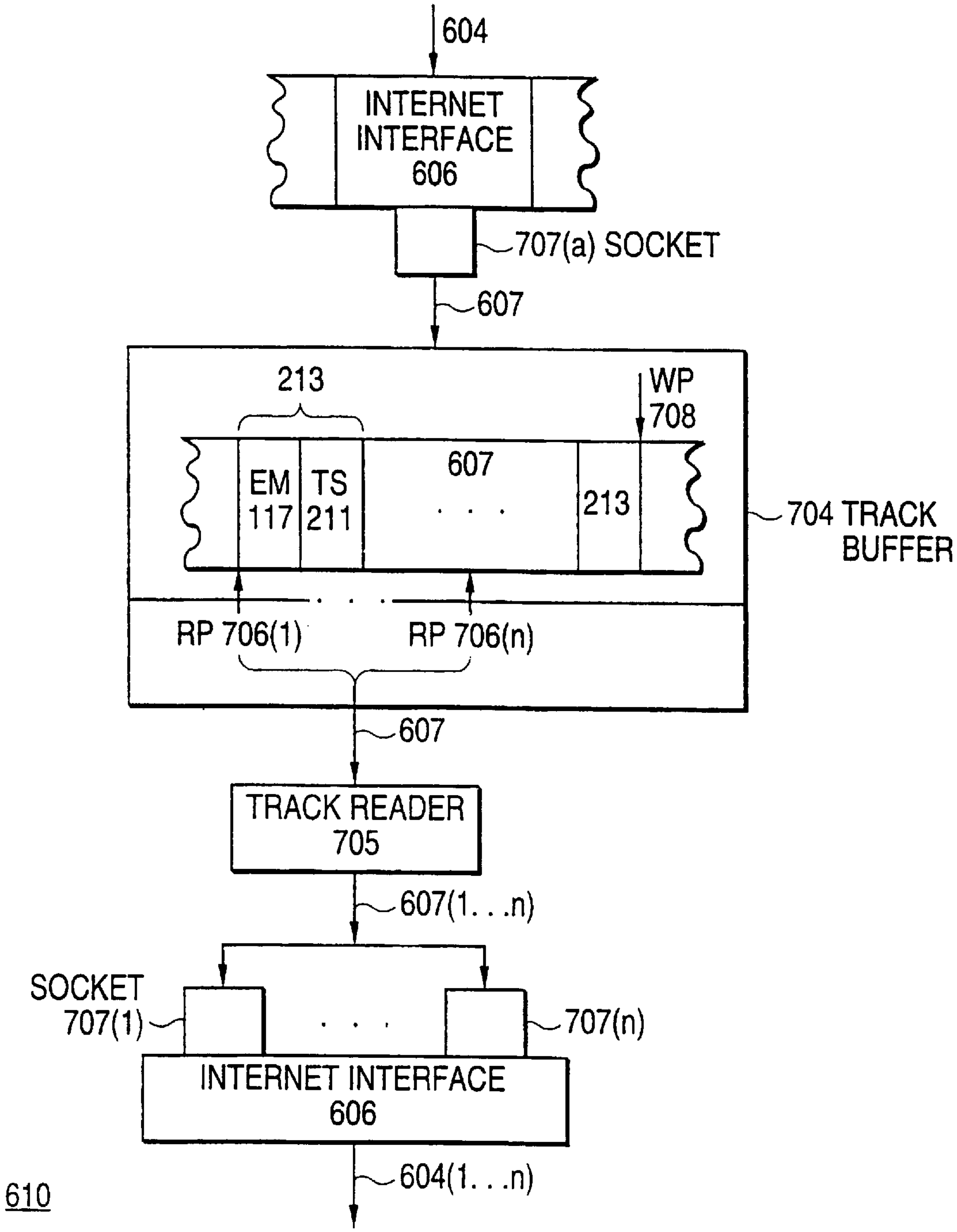
FIG. 7 is a detail of a technique for distributing a MIDI track over the Internet as the track is created.

Details of MIDI Track Generator 605 and Internet Site 610: FIG. 7

In a preferred embodiment, MIDI track generator 605 is implemented using the portion of a MIDI sequencer which generates a MIDI file from MIDI stream 111. That portion has been modified in two respects:

1. The MIDI track 607 generated by MIDI track generator 605 is not a standard MIDI track, 105 with elapsed time descriptors 119. Instead, it is a MIDI track like stored track 215 of the parent. In track 607, the elapsed time descriptors are replaced by time stamps 211. Each time stamp indicates the time that has elapsed between the time the first event message in the track was received in MIDI track generator 605 and the time the current event message was received. The time stamps thus give times relative to the beginning of the MIDI stream represented by track 607.
2. Instead of outputting track 607 to a file in the sequencer's memory as the track is created, it outputs track 607 to Internet interface 606 or to Internet site 610(*a*) as it is created.

Details of Internet site 610(*b*) are shown in FIG. 7. Internet site 610(*b*) receives and transmits information via sockets 707 in Internet interface 604. Each session with an entity to which or from which site 610 is receiving data has a socket 707. There are thus in FIG. 7 a socket 707(*a*) for the session with sender 621 and sockets 707(1 . . . n) for the receivers 619(1 . . . n). In the case of socket 707(*a*), the socket receives IP packets 604 from MIDI track generator 605 and produces therefrom data which contains MIDI track 607. The track data is stored in track buffer 704. As shown in FIG. 7, track 607 is made up of a sequence of event messages 117 and time stamps 211. A write pointer 705 indicates the point at which data from socket 707 is currently being written to track 607.

Track 607 is read as it is written by track reader 705. Track reader 705 maintains a read pointer 706 in track 607 for each receiver 619. FIG. 7 thus shows read pointers 706(1 . . . n). Of course, a number of the read pointers may point to the same position in track 607. As track reader 705 reads track 607 for a given receiver 619(*i*), it sends a portion of the track at the current position of read pointer 706(*i*) to socket 707(*i*) and updates pointer 706(*i*) to point to the next portion to be read for that client 619(*i*). If a read pointer 706(*i*) reaches the position of write pointer 708, track reader 705 simply stops sending portions of track 607 to receiver 619(*i*) until further portions of track 607 have been received in Internet site 610 and write pointer 708 has been updated accordingly.

Figure 8:
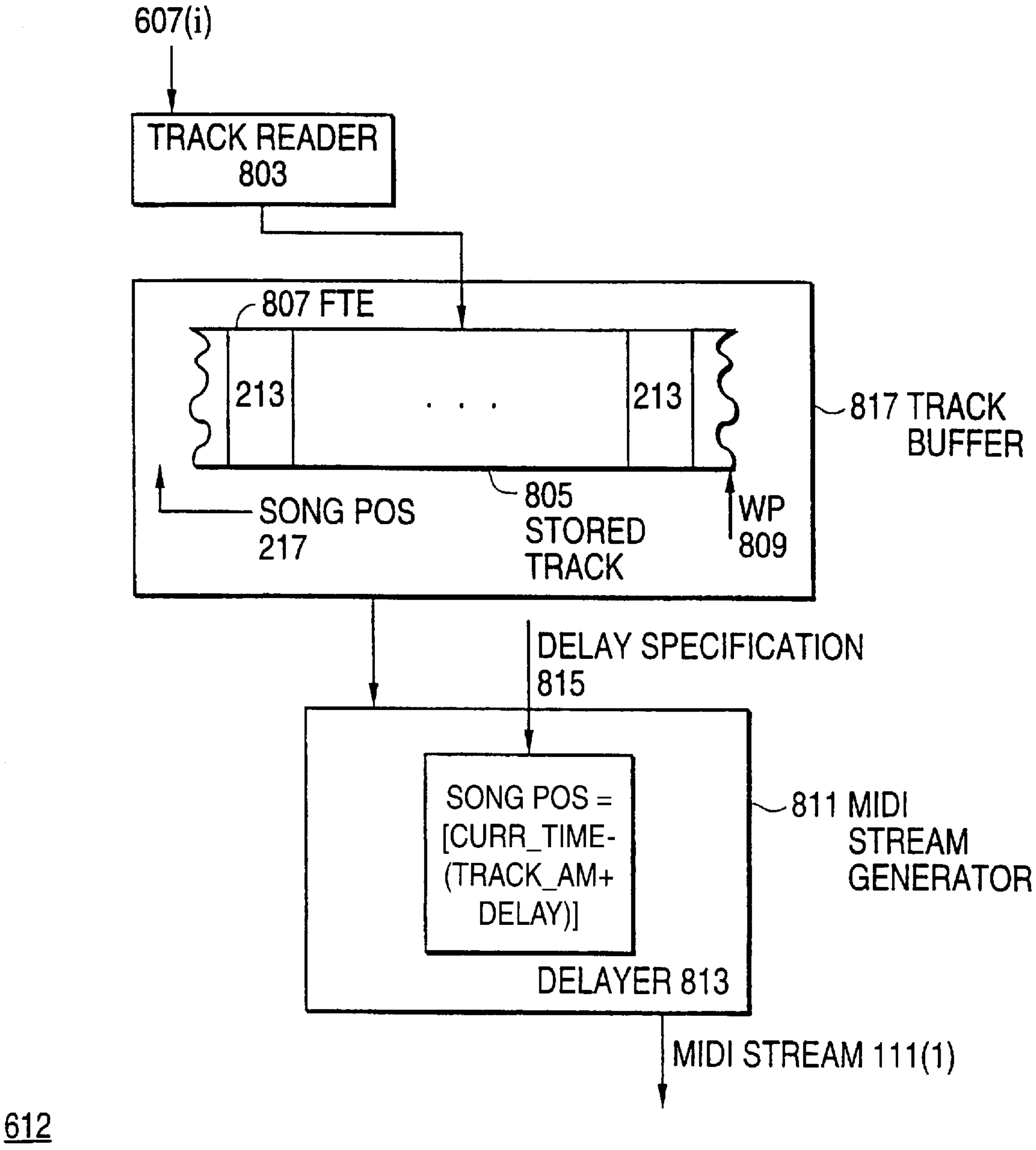
FIG. 8 is a detail of a technique for reading the track as it is received.

Details of Track-stream Transformer 612: FIG. 8

Track-stream transformer 612 is a variation on apparatus 201 of the parent patent application. Track reader 803 receives track 607(*i*) and parses it as it is received to obtain events 213; however, track 607(*i*) already contains time stamps 211, so there is no need to convert elapsed time stamps to time descriptors. The events are written to track buffer 817 in memory 109 to form stored track 805. The event currently being written is indicated by write pointer 809. MIDI stream generator 811 reads stored track 805 as explained for MIDI stream generator 219. MIDI stream generator 811, however, delays beginning to read stored track 805 until enough of stored track has accumulated to require the delay period to play.

In the preferred embodiment, the delay period is implemented as follows: first a server start time is determined which is the system time at which receiver 619 creates the buffer in which stored track 805 is stored. The delay period is then added to the server start time to obtain a play start time. Beginning at the start of stored track 805, the time stamp of each event is added to the server start time and subtracted from the play start time. If the result is negative, the amount of stored track 805 from that event to the beginning of the track is not enough to fill out the delay period. If the result is 0 or positive, there is enough of stored track 805 to fill out the delay period and receiver 619 can start playing the track from the beginning.

Because MIDI track 607 requires so little space to represent music, the first sequence of events to be received in receiver 619 often contains enough events to fill out the delay period, and receiver 619 can begin playing stored track 805 immediately. The portion of the code for MIDI stream generator 811 which executes this algorithm appears in FIG. 8 as delayer 813. As shown there, the amount of delay is received as a delay specification parameter 815 in delayer 813. In the preferred embodiment, the user of receiver 619(*i*) provides parameter 815; however, in other embodiments, it may be provided by Internet site 610 as described above or a combination of the techniques may be employed. For example, a default delay may be provided by Internet site 610 and the user may provide a delay parameter which overrides the default delay.

When a receiver 619 is implemented in a system which does not have a real-time operating system, for example, a system which employs an operating system such as Windows 95, the operating system can introduce an element of delay in the operation of MIDI stream generator 811. The delay occurs when the interval between reads of stored track 805 becomes longer than the 2 millisecond interval of the preferred embodiment. This problem is dealt with in the preferred embodiment by means of a MAX_JITTER parameter which specifies a maximum amount of time by which the time stamp 211 of an event 213 that specifies a note-on message may indicate a time that precedes the time represented by SongPos 217. If the time stamp of such an event exceeds MAX_JITTER, the event is not output to MIDI stream 111, thereby effectively dropping the note from the stream. Note off event messages and control event messages are, however, always output.

Figure 11:
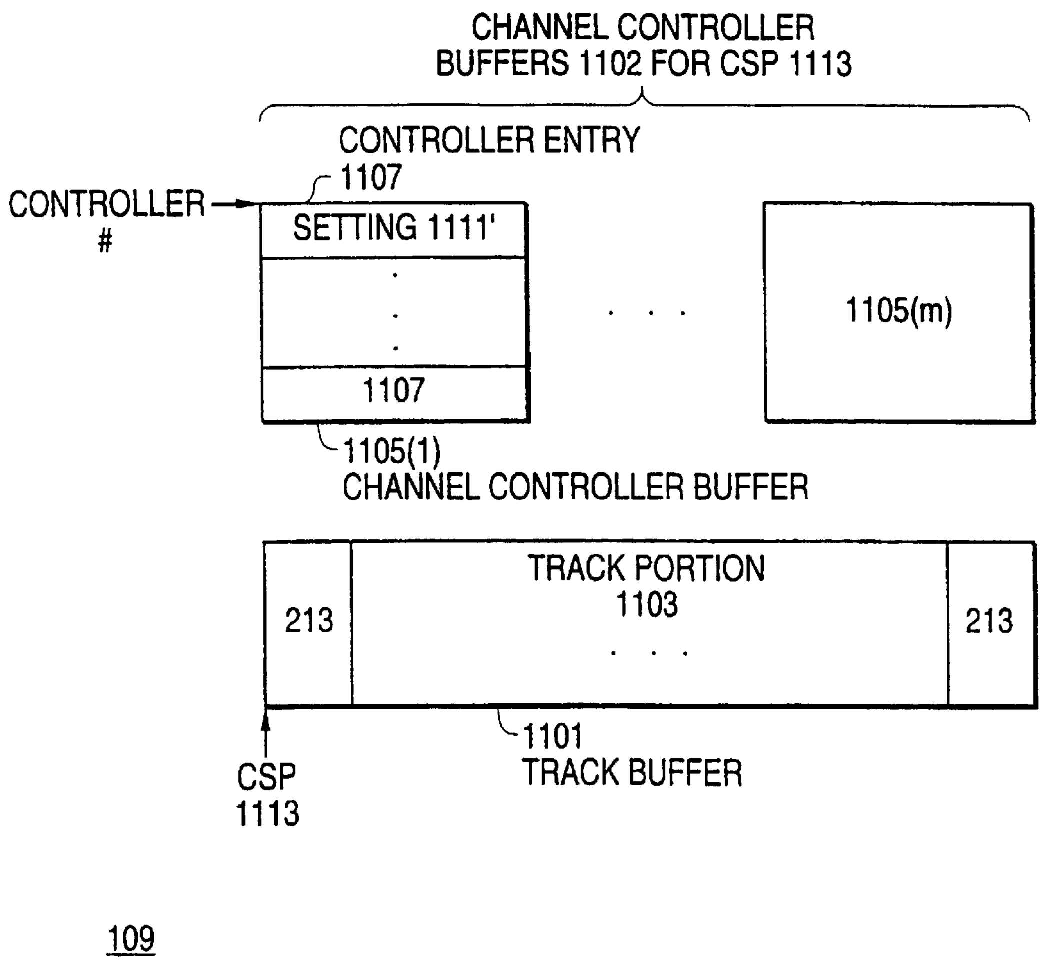
FIG. 11 is a detail of stored track 805 with an improvement which makes it possible to distribute an endless MIDI track.
Figure 12:
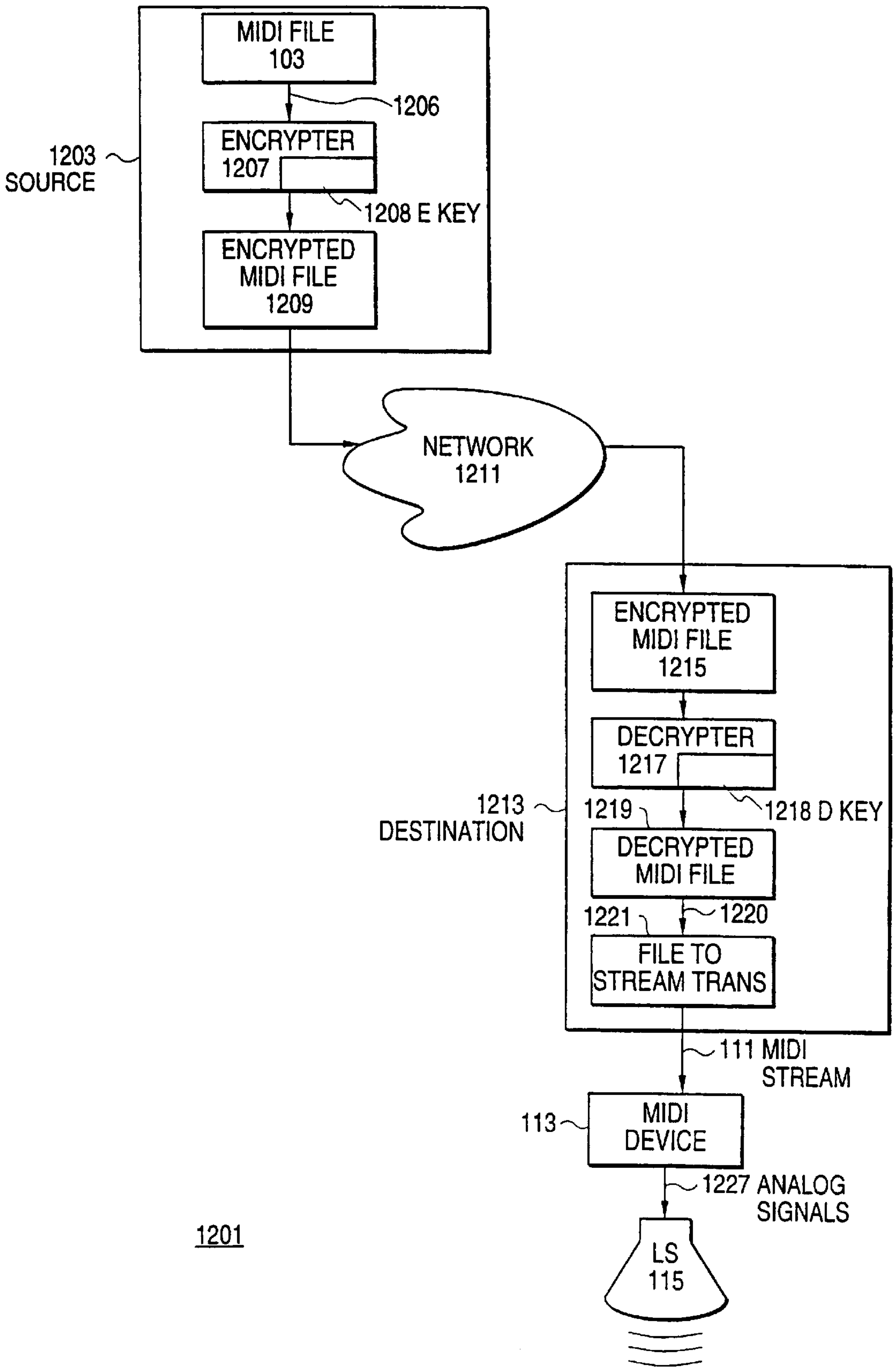
FIG. 12 (PRIOR ART)
FIG. 12 shows a prior-art technique for encrypting and decrypting MIDI files.

Separate Storage of Control State in System 601: FIG. 11

As described thus far, the live MIDI system has one drawback: receiver 619 must receive all of the track 607 that Internet site 610 has received. The reason for this is that the meaning of any given point in MIDI stream 111 is potentially determined by all of the control event messages and note off event messages which preceded that point in the stream. A receiver 619(*i*) may begin listening in the middle of track 607(*i*), but when it does so, track-stream transformer 612 must go to the beginning of track 607(*i*) and output all of the control event messages from the beginning up to the point where the listening is to begin to MIDI stream 111(*i*). That in turn means that the buffer in which track 805 is stored must be large enough to store the entire track 607. The same is of course true for track buffer 704 in Internet site 610.

There are several ways in which this difficulty can be dealt with. They all take advantage of the fact that most of MIDI stream 111 is made up of note on and note off event messages. One way, which still requires that all of the track that has been received so far is stored in Internet site 610, is to set up track reader 705 so that when a receiver 619 establishes a connection with a concert or recital that is already in progress, track reader 705 reads track 607 from the beginning and sends all of the control event messages that precede the current point in track 607 to the newly-joined receiver, but only begins sending on and/or off event messages when that point is reached. This technique is thus a modification of the one used in the parent of the present patent application to start outputting a MIDI stream from the middle of a MIDI track.

Another way of dealing with the difficulty which does not require that all of track 607 be stored in Internet site 607 is to make a separate control event buffer which contains only control event messages, but which can be made large enough to contain all of the control event messages from even the longest track 607. Track 607 continues to contain both control event messages and on-off event messages as before, but since the control event buffer will contain all of the control event messages received thus far in track 607, it is no longer necessary for track buffer 704 to contain all of track 607 that has been thus far received. When a new receiver 619 establishes a connection to Internet site 610, track reader 705 first outputs all of the event messages in the control event buffer to the new receiver and then begins outputting the entire track 607. This approach is also advantageous in that track reader 705 need only scan the relatively small control buffer from the beginning rather than the much larger complete track 607.

A third solution to the problem is shown in FIG. 11. This solution takes advantage of the fact that the only event messages that are really required to start reading track 607 in the middle are controller event messages. These messages specify settings of control devices on the MIDI devices which respond to the messages. Which MIDI devices respond is of course determined by the channel specified in the message. All of the controller event messages contain three bytes. The first byte specifies a channel number and a controller event message type, the second specifies the number of the controller, and the third specifies the setting of the controller. As can be seen from this, a given channel can have a maximum of 128 controllers, and the settings for a given controller can range from 0–127. The settings are furthermore absolute, and not relative to an earlier setting of the controller.

In the following, the current state of all of the controllers relevant to a given point in a track 607 will be termed the controller state of that point in track 607. The given point is specified by the value in time stamp 211 of the event 213 at that point in the track. One way of establishing the controller state of a given point in a track 607 is to simply transmit all of the control event messages from the beginning of track 607 up to the given point. Another way is shown in FIG. 11. There, the controller state of a given controller state point 1113 in a given portion 1103 of track 607 is represented by means of a set of controller state buffers 1102 corresponding to the controller state point 1113. There is a controller state buffer 1105(*i*) for each channel that is relevant at point 1113. Each buffer 1105(*i*) has 128 entries, one for each possible controller for the channel, and the entry for a given controller contains the setting for the controller at control state point 1113.

Given the controller state for a given controller state point 1113, Track reader 705 is able to generate the corresponding controller event messages and output them to MIDI stream 111. Track reader 705 can thus start reading track 805 at any point following a controller state point 1113. To start reading, Track reader 705 backs up to controller state point 1113, generates the controller event messages from the channel controller buffers 1102 for controller state point 1113, then outputs only control event messages up to the point at which reading is to begin, and at that point begins outputting all of the event messages in track portion 1103. The controller state buffers could of course also be sent to track-stream transformer 612 in receiver 619 when the connection with Internet site 610 is established and the controller event messages generated there. It seems more reasonable, though, to keep transformer 612 a simple reader of tracks and implement more complicated functions in Internet site 610.

Channel controller buffers 1102 must of course be kept current. One way to do this is to update buffers 1102 each time a new controller event message comes in and at the same time update controller state point 1113 to contain the timestamp for the latest controller event message. Another way to do it is to begin building a new set of channel control buffers 1102 at the point following the controller state point 1113 for the set of buffers 1102 currently being used and periodically merge the contents of the old and new buffers. Again, controller state point 1113 would be updated to reflect the position of the controller state buffers that are currently in use. In any case, the first set of channel controller buffers 1102 is of course set from the controller event messages that are sent prior to the beginning of a song.

With the foregoing arrangement, there is no longer any relationship whatever between the length of track 607 and the sizes of the buffers required to store track 607 in Internet site 610 or receiver 619. Moreover, MIDI track 607 may be endless. In such an endless track 607, it will be at most necessary to occasionally reset a timestamp value to 0 and recompute following timestamp values relative to the reset value. One use of such an endless MIDI track 607 is to provide background music; another use is to provide a site in the Internet at which musicians can come and go as participants in an endless jam session. This latter possibility will be explored in more detail below.

Making Music using Live MIDI

Figure 5:
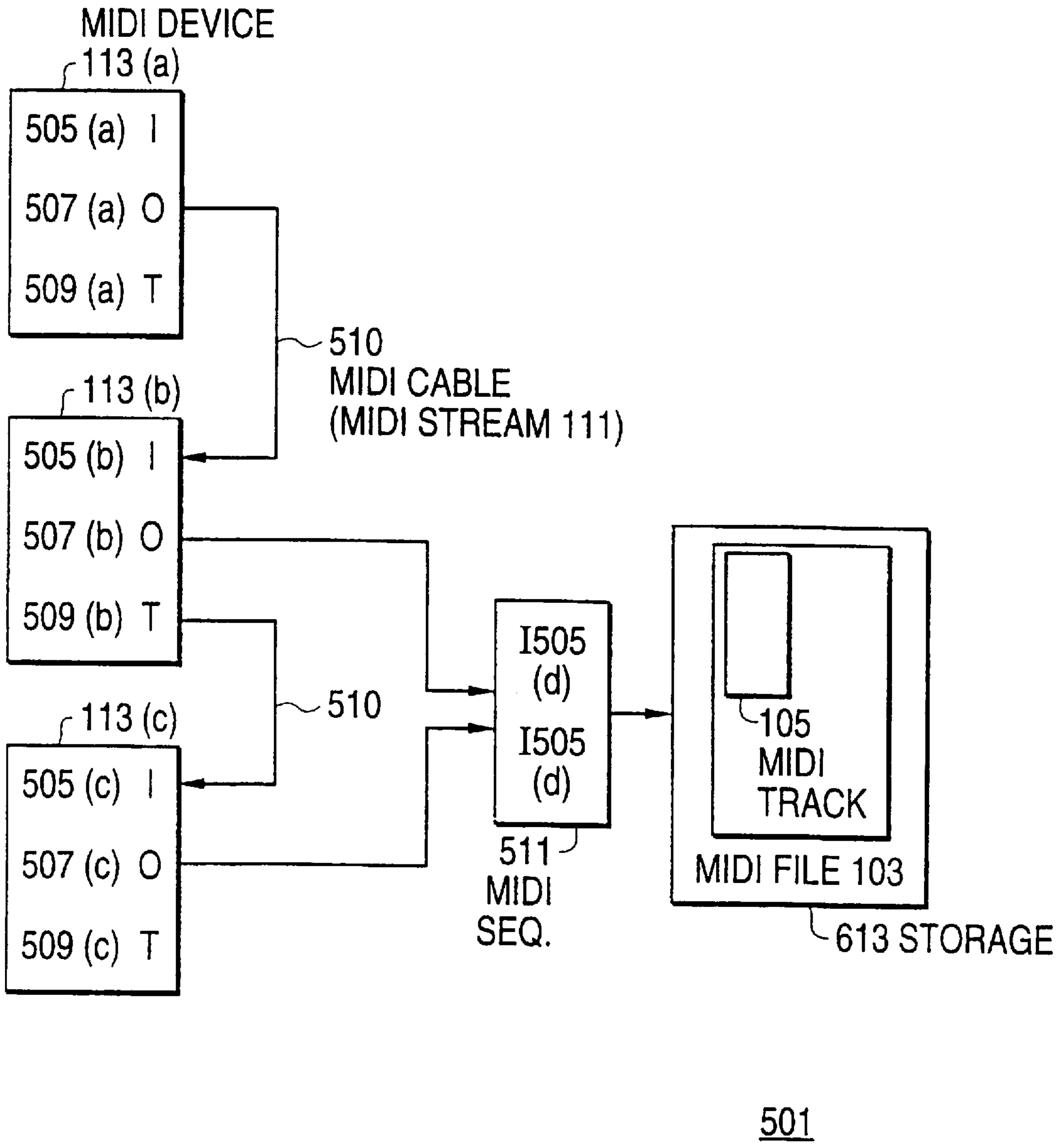
FIG. 5 (PRIOR ART)
FIG. 5 is a prior-art configuration of MIDI devices.

The techniques involved in live MIDI can also be used for participatory music making. If the MIDI device 113 in receiver 619 is a MIDI electronic instrument and the MIDI stream is output to the device's input connector, the electronic instrument will interpret the stream; while it is doing that, the user may use another input to the electronic instrument to play along. The arrangement would have the same effect as far as the MIDI stream is concerned as the connection between MIDI device 113(*a*) and 113(*b*) in FIG. 5. Another variation would be to additionally connect another MIDI device 113 to the first one by connecting the thru connector of the first device to the in connector of the other device, as is shown in the connection between device 113(*b*) and 113(*c*) in FIG. 5. This could be used where it is desired to play the stream on different types of MIDI instruments. Of course, people could play along on either instrument.

A refinement of playing along is the following: if a channel is assigned to each of the electronic instruments in an ensemble piece, Internet site 610 can indicate to a user who wishes to play along what channels correspond to what instruments, and a player of a given kind of instrument can provide a parameter to track-stream transformer 612 which indicates that track-stream transformer 612 is not to output event messages for that instrument's channel to MIDI stream 111. The player can then play along with the MIDI stream produced from the remaining channels. In other embodiments, the channel parameter could be provided to Internet site 610, which would then remove such events for the channel from track 607 sent to receiver 619 that provided the channel parameter. It should be noted here that this technique can also be employed when a MIDI device is being played from a MIDI file.

Figure 9:
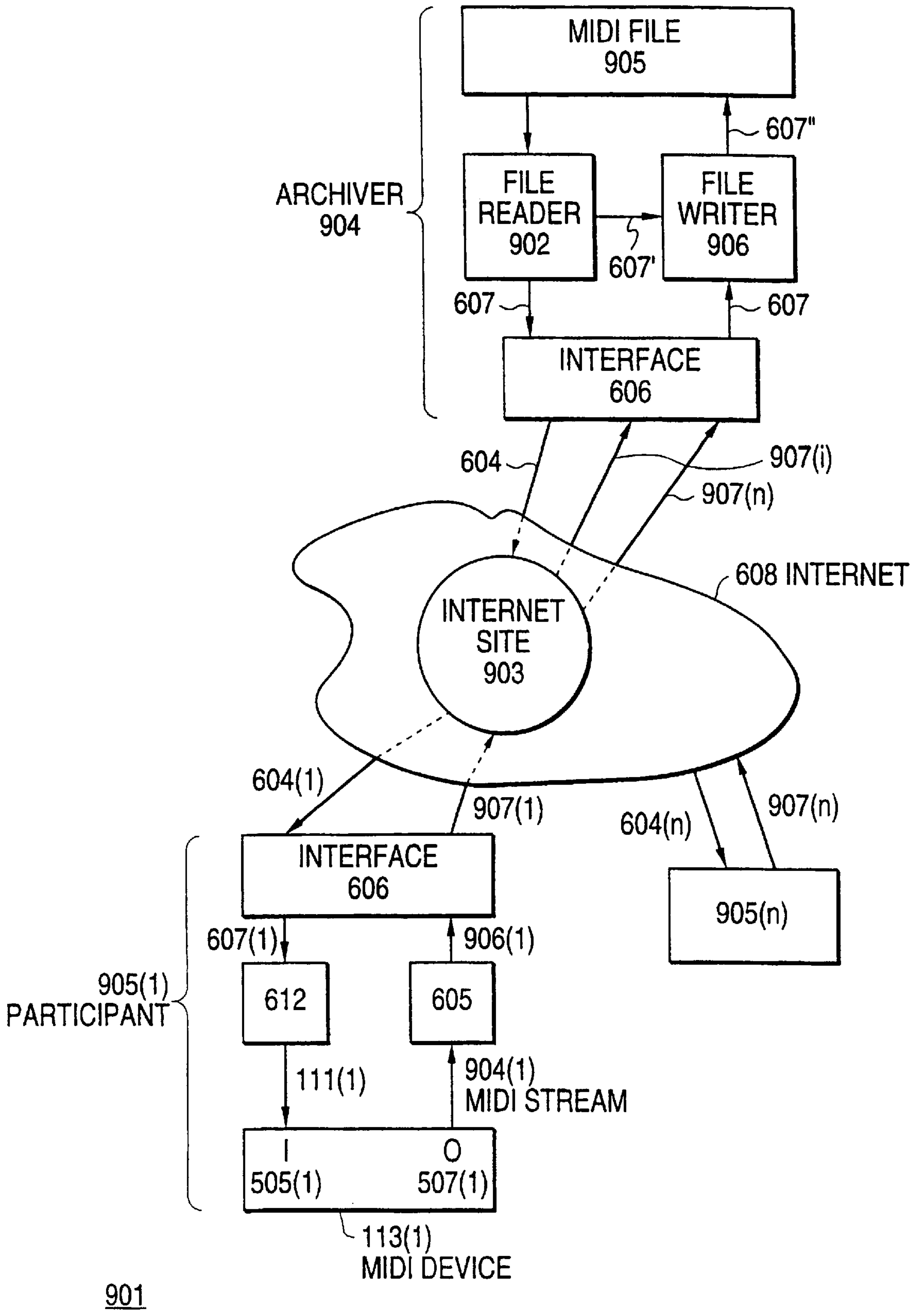
FIG. 9 is an overview of techniques which permit players of MIDI devices to collaborate using the Internet.

A system 901 which permits collaboration across the Internet is shown in FIG. 9. In FIG. 9, a number of participants 905 have connections via Internet 608 with Internet site 903. Each participant 905 not only has a track-stream transformer 612, but also a MIDI track generator 605, and consequently can not only receive a MIDI track from Internet site 903, but can also provide a MIDI track to Internet site 903. Internet site 903 has further been modified not only to provide MIDI tracks to participants 905, but also to receive MIDI tracks from the participants and provide them to the participants 905 or to other entities connected to Internet site 903.

One such entity, archiver 904, is shown in FIG. 9. Archiver 904 stores MIDI files 905 and includes a file reader 902 which reads MIDI file 905 to produce MIDI track 607 and a file writer 906 which reads a MIDI track 607 to produce a MIDI file 905. Since the difference between the MIDI tracks 607 employed in the preferred embodiment and the MIDI tracks 105 employed in standard MIDI files is simply the use of time stamp 211 instead of elapsed time descriptor 119, the transformations performed by reader 902 and writer 906 will pose no problems to those skilled in the art. As will be described in the following, system 901 with archiver 904 and one or more participants 905 can be used to produce music in the same fashion as is done in a modern recording studio.

System 901 as a Distributed Recording Studio

It is now often the case that the musicians recording a song are never present simultaneously in a recording studio. A session may proceed as follows: first a click track is made which sets the tempos for the song. Then the drummer comes in and follows the click track to produce a percussion track; thereupon, the bass player comes and produces his track as he listens to the percussion track. Then the lead vocalists or instrumentalists come and produce their tracks as they listen to the tracks that have already been made. Finally, the background vocalists and instrumentalists produce their tracks as they listen to the previously-made tracks. Once the whole song has been recorded in this fashion, individual participants may redo their tracks so that they better fit the whole.

MIDI music can be produced using system 901 in exactly the same fashion. When system 901 is so used, the MIDI device in a participant 905(*i*) has its own channel. The simplest way of using system 901 is to permit the players to modify a previously-made MIDI track stored in a file in archiver 904. When a player wishes to modify his or her part of the track, the player can request that Internet site 903 establish a connection with archiver 904 and begin receiving track 607 made from the file. Internet site 903 then provides the track in the manner previously described to track-stream transformer 612, which then provides the MIDI stream represented by the track to MIDI device 13(*i*).

The first time through, the performer may simply want to hear the present state of things. When the performer is ready to begin working on his or her part of the performance, he or she requests Internet site 903 to again provide the track, but this time provides a channel parameter to transformer 612 that operates in the manner described above with regard to playing along to inhibit track-stream transformer 612 from outputting event messages for the channel. The performer begins playing his or her part, and his MIDI device 113(*i*) outputs a MIDI stream 904(*i*) of event messages on the MIDI device's channel. Stream 904(*i*) may be simply event messages for the MIDI device's channel, or the MIDI device 13 may also provide all of the event messages that it received in stream 111(*i*). In the latter case, MIDI stream 904(*i*) is effectively the original performance with a new version of the player's channel.

MIDI track generator 605 then makes the stream into a track 906(*i*) with time stamps 211 relative to the beginning of the song, Internet interface 606 sends track 906 as a sequence of packets 907, and Internet site 903 delivers the packets to archiver 904, where a new version of MIDI file 905 is created. If MIDI stream 904(*i*) is only a single channel, file writer 906 can easily integrate the new channel into MIDI file 905 by having file reader 902 read MIDI file 905, removing the event messages for the channel as it does so, and providing the modified track 607' to file writer 906. File writer 906 then simply incorporates the track 906(*i*) with the new version of the channel into track 607' to produce track 607". The incorporation is easily done, since the time stamps in track 906(*i*) indicate where the event messages for the channel are to go in track 607".

The player can repeat the foregoing process as many times as necessary, and the same can be done by each player in the group. An important advantage of working in the manner described above is that it ensures that all of the players are working on the same copy of MIDI file 905. Indeed, all of the techniques employed to ensure consistency of a document produced by a group can be used in system 901.

System 901 can be used for collaboration even where there is no preexisting MIDI file 905 to be worked on. This can be done as follows: all of the musicians have established connections with Internet site 903. Then one musician, perhaps the drummer, begins playing, to produce MIDI stream 904(1), which goes to Internet site 903 and is immediately sent to the participant systems 905 for the other performers. They begin playing as their MIDI devices 113 begin outputting stream 111(1), and as they play, their contributions are output as MIDI tracks 906 (2 . . . n) to Internet site 903, which provides the tracks to archiver 904. Archiver 904 combines the tracks in a MIDI file 905, and that file can be then worked on in the manner just described.

Figure 10:
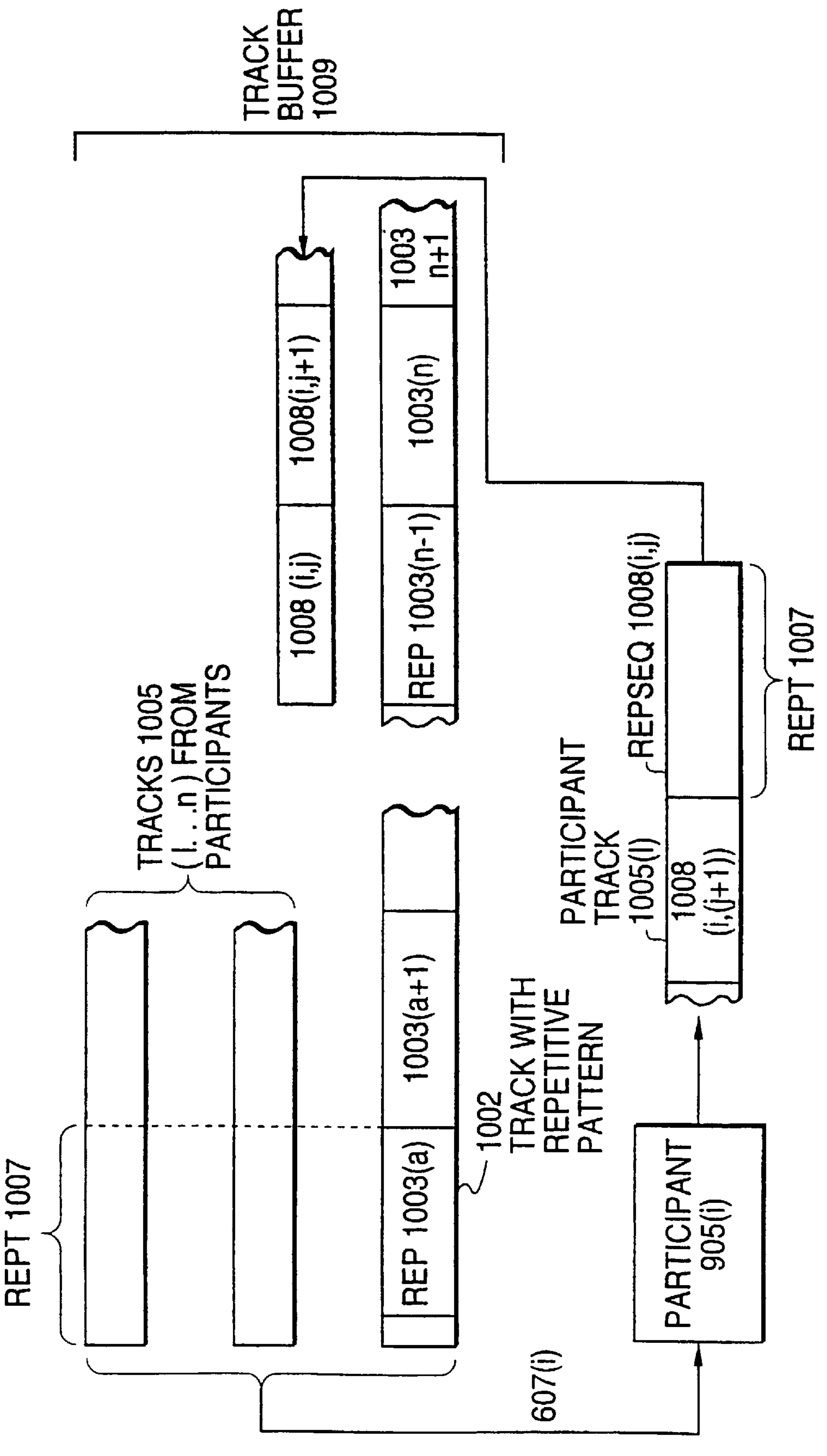
FIG. 10 is a detail of buffer 704 in a version of the system of FIG. 9 which makes it possible for users of the Internet to participate in jam sessions.

Using System 901 for Jam Sessions on the Internet: FIG. 10

One of the new modes of communication which the Internet has made possible is the so called chat session, in which people can send messages to a site in the Internet and receive all of the messages that arrive at the site as they arrive. The result is the equivalent of a conversation among a group of people, except that written messages replace spoken words. Unlike a normal conversation, an Internet chat session can go on forever, with participants coming and going as they like. The musical equivalent of a conversation is a jam session. System 901 makes it possible to have an Internet jam session that is the musical equivalent of an Internet chat session.

The Internet jam session is rendered possible by the fact that there is an underlying repetitive structure in most jam sessions which defines the rhythm and harmony. Everything the participants do fits this underlying structure, and consequently, something that a participant plays in one repetition will generally make sense in a later repetition as well.

When Internet site 903 in system 901 is supporting an Internet jam session, it continually provides at least a track that represents the repetitive pattern as track 607. When a participant 905(*i*) joins the Internet jam session, the track 607(*i*) that he receives is made up of event messages from the repetitive pattern, and if there are currently participants in the jam session, event messages from tracks output from other participants 905. Each track from a participant 905 is synchronized with the repetitive pattern. Of course, because of the delays involved, the tracks from which track 607(*i*) is currently being produced is made up of tracks from participants 905 that were produced at different times. However, because each track works with the repetitive pattern, the tracks will generally also work with each other. When a given participant 905(*i*) begins producing an output track, it becomes one of the tracks from which track 607(*i*) is being produced. As with the play-along application of system 601, the tracks from which the jam session output is produced may contain event messages for a channel that represents a given instrument. If the user of participant 905 plays that instrument, he or she can indicate that fact to participant 905 and Internet site 903. Participant 905 will then not output event messages for that channel to MIDI stream 111(*i*).

FIG. 10 shows the synchronization technique described above in more detail. A track buffer 1009 in Internet site 903 contains the tracks from which the track 607(*i*) sent to participant 905(*i*) is produced. The tracks include a track 102 with a repetitive pattern 1003 which has a repetition time 1007 and may include tracks 1005(1 . . . n) from other participants 905. Tracks 1005(1 . . . n) are synchronized with repetition pattern 1003. A simple way to do this is to reset the value used in the time stamps to 0 at the beginning of each repetition pattern in track 1002 and to set up each participant 905 to do the same with the track 1005 it produces.

A given participant 905(*i*) receives track 607(*i*) which has been produced in the manner just described. Participant 905(*i*) suppresses the event messages for the channel upon which participant 905(*i*) is going to provide output, and then begins providing track 1005(*i*), with time stamps that are synchronized with the periods of the time stamps of track 607(*i*). Track 105(*i*) contains repetition sequences 1008, each of which fits repetitive pattern 1003. When Internet site 903 begins receiving track 1005(*i*), it synchronizes the repetitive sequences 1008 8 in 1005(*i*) with repetitions 1003 and outputs the track as part of output 607 to other participants. As may be seen from the foregoing, a participant 905 may join or leave the jam session at any time, and there may be any musically practical number of participants. Of course, the techniques described above for obtaining and saving the current controller state can be employed in this application as well. There are also many ways of enhancing the Internet jam session experience. For example, the participant could be permitted to listen to the channels for the current participants and select those he wished to jam with. A participant could also request Internet site 903 to make a recording of the MIDI track for his session and send it to him at the end of the session. Internet site 903 could of course use Archiver 904 to do this in the manner described for the distributed recording studio.

Figure 13:
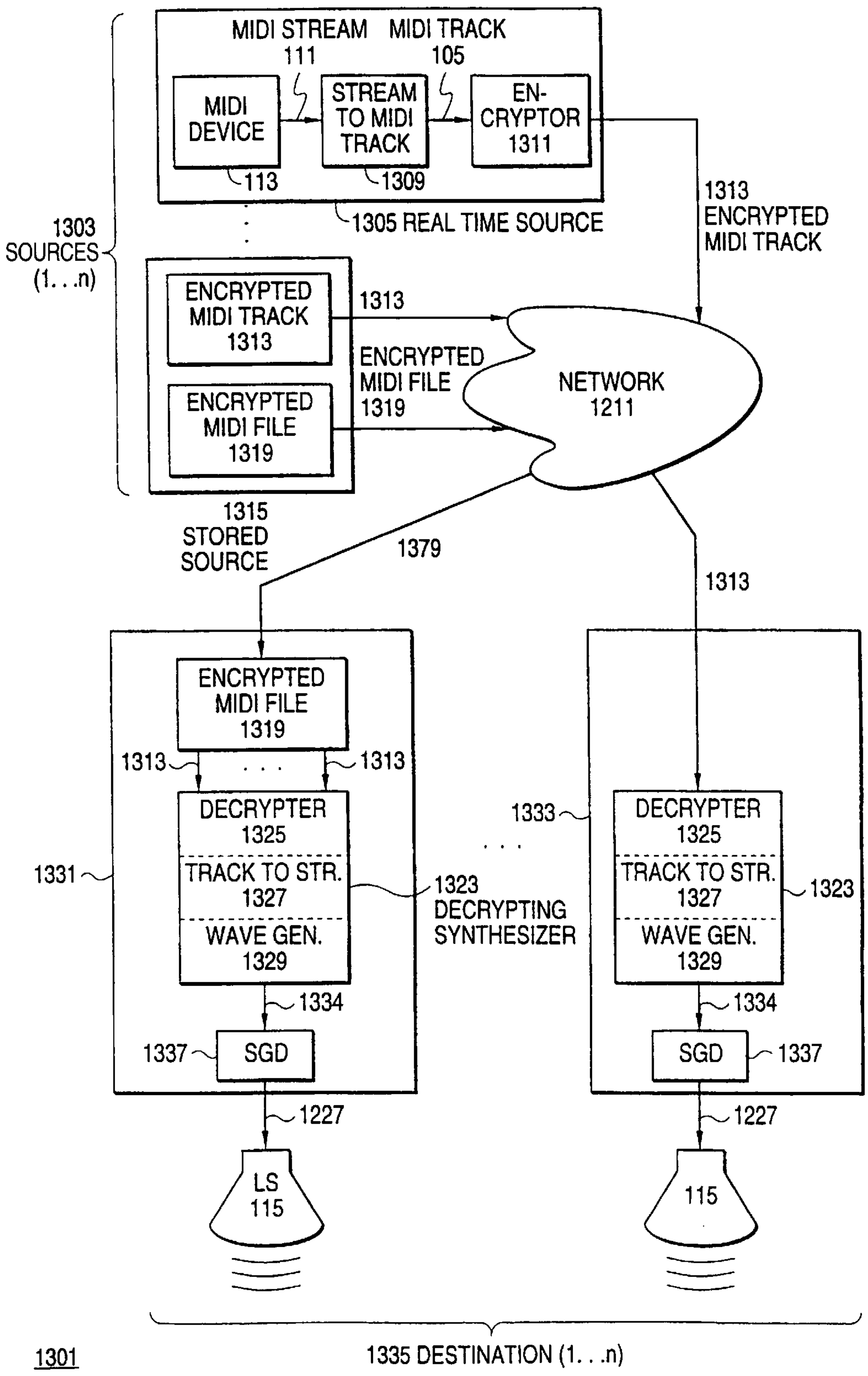
FIG. 13 shows a technique for encrypting and decrypting MIDI files which does not give a user access to a decrypted MIDI file, track, or scheme.
Figure 14:
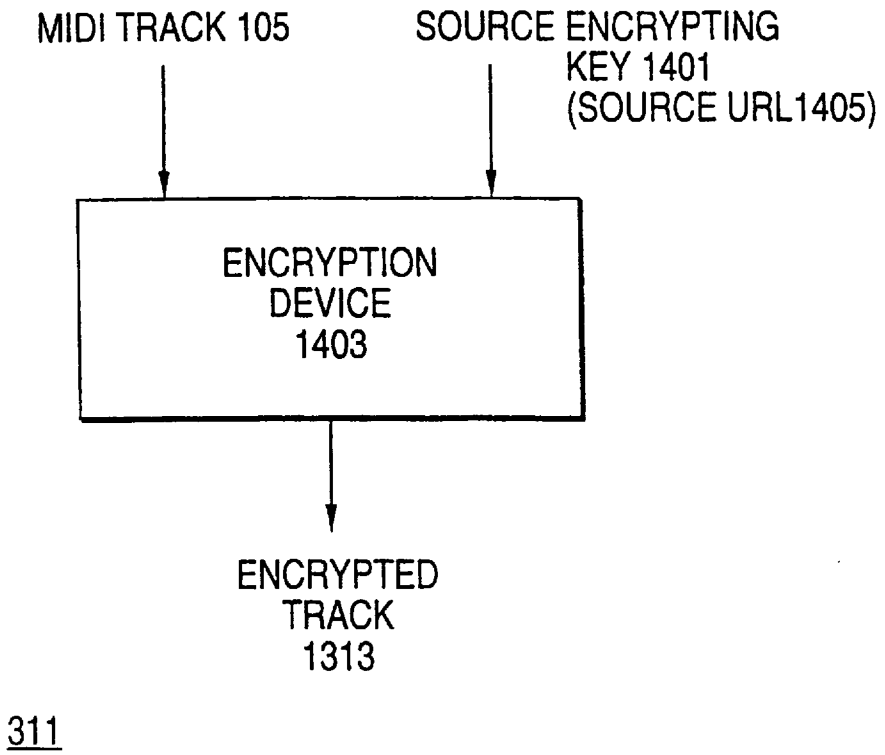
FIG. 14 shows encryption in a preferred embodiment.
Figure 15:
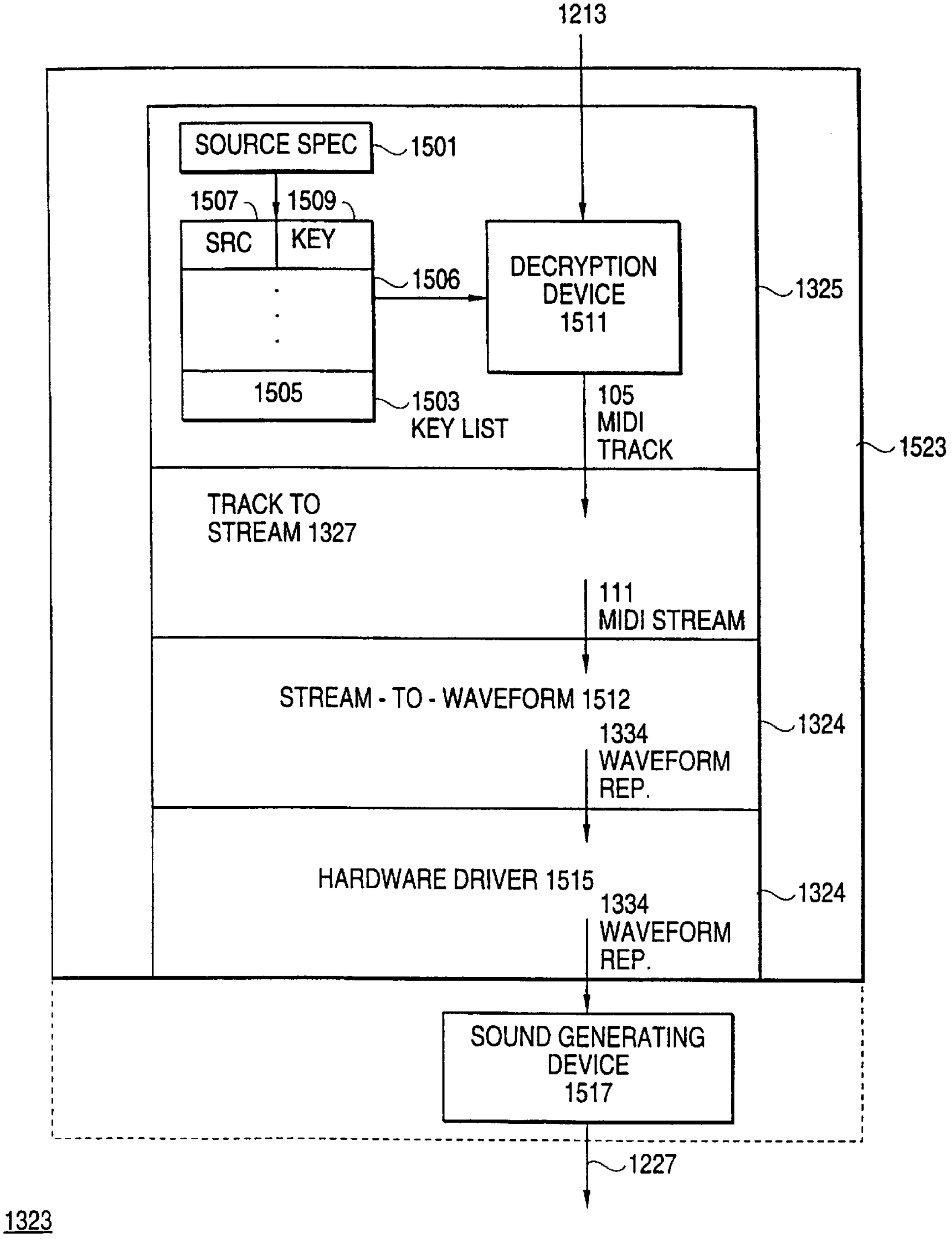
FIG. 15 shows decryption in a preferred embodiment.

Encrypting and Decrypting MIDI Files and Tracks: FIGS. 13–15

An encryption and decryption system which is able to provide the fundamental level of security needed for commercially viable distribution of MIDI tracks and files can be built according to the following principles:

- All MIDI files on disk drives, diskettes, and CD-ROMS and all MIDI files or tracks in transit through the Internet must be encrypted;

Decryption must be done in a decrypter that is an integral part of the MIDI device. That is, the MIDI device must receive an encrypted track or file as input and produce as output either a digitized waveform specification of the output of the MIDI device or the audio signal itself.

Preferably, the MIDI device will produce the audio signal as its output; however, the fact that the waveform equivalent of the MIDI file or track is so much larger than the MIDI file or track provides useful protection for the MIDI publisher.

If the MIDI device is implemented in hardware, a decrypter that is an integral part of the MIDI device is one whose output cannot be tapped either as a decrypted MIDI track or file or as a MIDI stream by an ordinary user without destroying the hardware. If the MIDI device is implemented in software, the decrypter and other components of the MIDI device must be implemented as a single executable code module whose subcomponents cannot be replaced at runtime by corresponding components provided by the user. In particular, the other components cannot be implemented using DLLs for generating MIDI streams from MIDI files or tracks or waveforms from MIDI streams.

An Implementation of the Principles: FIG. 13

FIG. 13 shows a MIDI encryption and decryption system which conforms to the above principles. There are three main components in the system: a number of sources 1303(1 . . . n) of MIDI tracks and files, a number of destinations 1335(1 . . . m) for the tracks and files, and a network 1211 for transferring the tracks and files between the sources and the destinations.

Beginning with sources 1303, there are basically two kinds of sources, real-time sources 1305, in which MIDI tracks and files are produced from MIDI streams 111, and stored sources 1315, where previously created tracks and files are stored. A real time source will typically be connected directly to a MIDI device 113 which is producing a MIDI stream 111. That MIDI stream is converted to a MIDI track 105 by stream-to-track transformer 1309, which will typically be a MIDI sequencer 511 and will then go to encrypter 1311, which will encrypt the MIDI track. Encrypted MIDI track 1313 may then be stored on a medium such as a floppy disk, or it may be sent to network 1211 as it is created. As described in the parent of the present application, one case where the latter is done is when a recital is being performed at source 1305 and being distributed via network 1211 as it is being performed. What is important with regard to real-time source 1305 is that only encrypted MIDI tracks and files leave real-time source 1305. One simple way of ensuring this is to make encrypter 1311 an integral part of a sequencer 511.

Stored sources 1315 simply contain encrypted MIDI tracks 1313 or files 1319 stored on storage media in a device that has access to network 1211. In many embodiments, stored source 1315 will not contain any decrypter, and will simply answer requests for MIDI songs from destinations 1335 by transmitting encrypted tracks or files for the songs via network 1211 to the requester destination 1335.

Network 1211 may be any kind of LAN or WAN, but in a preferred embodiment, it is a network with non-real-time protocols such as the Internet. Techniques for transferring MIDI tracks and files via the Internet are described in detail in the parent and grandparent of the present application.

Continuing with destinations 1335, a destination 1335 may either receive encrypted MIDI files 1321 or encrypted MIDI tracks 1313. In the former case, the destination appears as a MIDI file player 1331 and in the latter as a MIDI track player 1332. The difference between the two is that track player 1332 plays tracks as they are received from network 1211 and does not store the track being played beyond what is necessary to overcome network delays. File player 1331, on the other hand, plays from a stored encrypted MIDI file, as may be seen from the presence of encrypted file 1319 in file player 1331. Most destinations 1335 will of course be able to function as either a track player or a file player. In the case of the MIDI file player, the player may receive the file via network 1211, or may have a disk drive for playing diskettes or CD-ROMS with MIDI files on them.

What is common to both track player 1331 and file player 1331 is a decrypting synthesizer 1323. In the preferred embodiment, this is an executable code module that has integral to it a decrypter 1325, a MIDI track to stream transformer 1327, and at least a wave generator 1339. The latter component transforms a MIDI stream 111 into waveforms of the kind interpreted by sound cards. It is advantageous if sound generation device 1337, which produces audio from waveforms, is also integral to the module. As indicated above, what is meant in this case by "integral to the module" is that the ordinary user of the module cannot access the decrypted MIDI track, the MIDI stream made therefrom, and, most advantageously, also the waveforms, from outside the module, and further cannot replace components of the module with other components at run time. As can be seen from FIG. 13, decrypting synthesizer 1323 conforms to the general principles set forth above in that it receives encrypted tracks 1313 as input and produces either analog audio output 1227 or digital waveforms 1334, depending on whether sound generating device 1337 is an integral part of decrypting synthesizer 1323.

Details of Encrypter 1311: FIG. 14

Encryption of MIDI tracks or files may be done using any known data encryption method. As shown in FIG. 14, encryption is typically done using a software or hardware encryption device which takes as its inputs MIDI track 105 (or a MIDI file 103) to be encrypted and an encryption key 1401 and outputs an encrypted track 1313 (or file 1319). As would be expected by the nature of the business of publishing MIDI tracks and/or files, source encryption key 1401 will be unique to a publisher, but will be so chosen that decrypting keys for track 1313 may be easily distributed to many destinations 1335. In a preferred embodiment, source encrypting key 1401 is simply a Universal Resource Locator (URL) 1405 which identifies source 1303 in the Internet. URL 1405 is used as a public key in a public key encryption system, and all destinations 1335 have private keys which enable them to decrypt MIDI files and tracks encrypted with URL 1405. For details on public key encryption systems, see the Schneier reference supra.

Details of Decrypting Synthesizer 1323: FIG. 15

FIG. 15 shows a detail of decrypting synthesizer 1323, showing embodiment 1329, in which the output of decrypting synthesizer 1323 is waveform descriptions 1334, or embodiment 1523, in which the decrypting synthesizer includes sound generating device 1517 and outputs audio analog signals 1227. Beginning with decrypter 1325, decrypter 1325 includes decryption device 1511 and data structures for handling decryption keys. Decryption device 1511 may be hardware or software that decrypts data which has been encrypted according to the encryption technique used in encrypter 1311. Decryption device 1511 takes as its inputs an encrypted MIDI track 1213 and a key 1509 and produces an unencrypted MIDI track 105 which is provided as it is produced to track to stream transformer 1327.

In a preferred embodiment, decrypter 1325 can decrypt MIDI tracks or files from several sources. In order to do this, it maintains a key list data structure 1503 in which there is an entry 1505 for each source. The entry includes a specifier for the source 1507 and a key 1509 that decrypter 1511 currently uses to decrypt MIDI tracks or files from that source. Which key is to be used to decrypt a given file or track is determined by means of a source specifier 1501. Source specifier 1501 may be part of a header received with the MIDI track or file, or it may be obtained when a user of a destination 1335 establishes a connection to a source via network 1211. In either case, source specifier 1501 is used to locate entry 1505 for that source and key 1509 in that entry is used to decrypt the track or file.

A problem in the implementation of decrypting synthesizer 1323 is keeping the keys 1509 secret. The problem has two parts: obtaining the keys in the first place and storing them securely. In a preferred embodiment, both problems are solved by making key list 1503 an integral part of the executable code for decrypting synthesizer 1323. Since there is no separate storage for the keys, a normal user will not be able to locate them in memory or on disk. This solution takes advantage of the fact that the preferred embodiment is implemented as part of a plugin for a browser and is obtained by using the browser to download the plugin. If new sources are added or the key for a source is changed, the user can get the new keys simply by downloading a new version of the plugin.

In other embodiments, keys might be downloaded and loaded into key list 1503 as part of a protocol by which a user of a destination 1335 signs up for MIDI tracks or files from a given source 1303. In such an embodiment, the key would need to be encrypted when it was sent across network 1211 and decrypter 1325 would need to be able to decrypt the key. Schneier, supra, describes a number of techniques for key management that could be employed in system 1301. If the keys 1509 are not stored as part of the program for decrypting synthesizer 1323, they will need to be stored in persistent storage belonging to the system upon which destination 1335 is implemented, and will need to be encrypted when they are stored.

As previously mentioned, keys may have different granularities. A given key may permit decrypter 1325 to decrypt everything received from a given source 1305 or only certain things, for example a given song or a given recital. In the later cases, the key is best transferred as part of the protocol for purchasing the song or recital.

In different embodiments, the relationship between a key 1509 and decrypting synthesizer 1325 may also vary. One simple approach is to associate a given key 1509 with a given copy of the plugin containing decrypting synthesizer 1323; in the context of single-user systems, this is perfectly adequate. With multi-user systems, it may be necessary to associate keys with a given site, with given users, or even with given instantiations (specific executions) of the plugin containing decrypting synthesizer 1323. In cases where the association is dynamic (for example with the instantiations), the association would be done as part of the protocol for purchasing a song or recital.

Operation of decrypting synthesizer 1523 is as follows: as decryption device 1511 decrypts MIDI events, it immediately provides them to track to stream transformer 1327, which maintains only enough of a buffer of MIDI events to deal with the delay problems described in the parent of the present application and with multiple events which occur at substantially the same point of time in the MIDI stream. The buffer is of course part of the address space of the task which is executing the software for destination 1335 and is not accessible to other processes in the system.

As track to stream transformer 1327 produces MIDI stream 111, it immediately provides it to stream-to-waveform transformer 1512, which produces a stream of digitized representations 1334 of the waveforms that would be produced by MIDI devices responding to MIDI stream 111. The waveform representations are in turn sent as they are produced to hardware driver 1515, which puts the representations into the form required for sound generating device 1517, which actually generates the audio signals 1227 to which loudspeaker 115 responds.

In some embodiments, sound generating device 1517 is a sound card with a digital signal processor; in others, sound generating device may be the microprocessor upon which the software by means of which destination 1335 is implemented is executing. In the latter case, shown in FIG. 15 as 1523, there is no point in decrypting synthesizer 1323 at which a normal user has access to a form of the original encrypted MIDI track or file which is useful for making digital copies thereof.

CONCLUSION

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. An improved synthesizer of the type which includes apparatus for producing an analog output from a track containing events to which a synthesizer responds, the improvement comprising:

a decrypter integral with the synthesizer which receives an encrypted track, serially decrypts the encrypted track to obtain the events, and provides the events to the apparatus for producing an analog output while the remainder of the encrypted track is being decrypted.

2. The synthesizer set forth in claim 1 wherein:

the apparatus for producing an analog output has components including at least a stream generator for receiving the events and generating a stream from the events as they are received, a wave form generator for receiving the stream and generating waveforms from the stream as it is received; and a sound generator for generating the analog output from the waveforms as they are received; and at least the decrypter, the stream generator, and the wave form generator components are implemented in executable code such that none of those components can be replaced at run time.

3. The synthesizer set forth in claim 2 wherein:

the sound generator as well is implemented in executable code such that the sound generator cannot be replaced at run time.

4. The synthesizer set forth in claim 1 wherein:

the decrypter employs a key to decrypt the encrypted track; and the key is integral to the synthesizer.

5. The synthesizer set forth in claim 1 wherein:

the synthesizer receives tracks encrypted with a plurality of first keys; and a plurality of second keys corresponding to the first keys is integral to the synthesizer, the decrypter employing a second key corresponding to a given one of the first keys to decrypt a track encrypted with the given first key.

6. The synthesizer set forth in either claim 4 or claim 5 wherein:

the synthesizer is implemented as a plugin for a browser.

7. The synthesizer set forth in claim 1 wherein:

a plurality of tracks encrypted with first keys are provided by track providers;

a user of the synthesizer makes an arrangement with a given track provider to receive a given one of the tracks; and a second key corresponding to the first key for the given track is provided to the synthesizer as part of the arrangement to receive the given track.

8. The synthesizer set forth in claim 7 wherein:

the synthesizer is implemented as a plugin for a browser; and the second key is integral to the plugin.

9. The synthesizer set forth in claim 7 wherein:

the second key is provided in encrypted form to the synthesizer; and the synthesizer decrypts the encrypted form and stores the decrypted second key integrally to the synthesizer.

10. The synthesizer set forth in claim 7 wherein:

at least one of the first keys is a URL for a provider of the track.

11. The synthesizer set forth in claim 7 wherein:

a first given one of the second keys is usable to decode all tracks provided by a given track provider.

12. The synthesizer set forth in claim 7 wherein:

a first given one of the second keys is usable to decode some tracks provided by a given track provider.

13. The synthesizer set forth in claim 7 wherein:

a first given one of the second keys is usable only to decode a single track provided by the given track provider.

14. The synthesizer set forth in any of claims 11 through 13 wherein:

the synthesizer has a plurality of users; and the first given one of the second keys is usable only to decode a track for a given user of the synthesizer.

15. The synthesizer set forth in any of claims 11 through 13 wherein:

there is a plurality of instantiations of the synthesizer; and the first given one of the second keys is usable only to decode a track for a given instantiation of the synthesizer.

16. The synthesizer set forth in any of claims 11 through 13 wherein:

the synthesizer is implemented at least in part in code executable by a processor; and the first given one of the second keys is usable only to decode a track for a given copy of the code.

17. The synthesizer set forth in claim 1 wherein:

the synthesizer is implemented as a plugin for a browser.

18. Data storage apparatus characterized in that:

the data storage apparatus contains code which when executed by a processor implements the improved synthesizer of claim 1.

* * * * *